United States Patent
Smith

(10) Patent No.: US 9,609,018 B2
(45) Date of Patent: Mar. 28, 2017

(54) SYSTEM AND METHODS FOR REDUCING IMPACT OF MALICIOUS ACTIVITY ON OPERATIONS OF A WIDE AREA NETWORK

(71) Applicant: WANSecurity, Inc., Overland Park, KS (US)

(72) Inventor: Robert Smith, Overland Park, KS (US)

(73) Assignee: WANSecurity, Inc., Overland Park, KS (US)

( * ) Notice: Subject to any disclaimer, the term of this patent is extended or adjusted under 35 U.S.C. 154(b) by 0 days.

(21) Appl. No.: 14/705,857

(22) Filed: May 6, 2015

(65) Prior Publication Data

US 2015/0326589 A1 Nov. 12, 2015

Related U.S. Application Data

(60) Provisional application No. 61/990,569, filed on May 8, 2014.

(51) Int. Cl.
*H04L 29/06* (2006.01)

(52) U.S. Cl.
CPC .......... *H04L 63/1458* (2013.01); *H04L 63/02* (2013.01); *H04L 63/0227* (2013.01);
(Continued)

(58) Field of Classification Search
CPC . H04L 63/1458; H04L 63/02; H04L 63/0227; H04L 63/1408; H04L 63/145; H04L 63/1475; H04L 63/20
(Continued)

(56) References Cited

U.S. PATENT DOCUMENTS 7,257,833 B1 * 8/2007 Parekh ............... H04L 63/0227
726/1
2010/0077457 A1 * 3/2010 Xu ......................... H04L 63/08
726/4
(Continued)

FOREIGN PATENT DOCUMENTS

WO 2013058944 A1 4/2013

OTHER PUBLICATIONS

International Searching Authority, USPTO; Notification of Transmittal of Int'l Search Report & Written Opinion dated Aug. 13, 2015; pp. 1-10.

*Primary Examiner* — Michael S McNally
(74) *Attorney, Agent, or Firm* — Lane Powell PC

(57) ABSTRACT

System architecture and methods for controlling improper network activity in a wide area network, where the system includes multiple service provider devices configured to provide communications service to attack vector devices. Each service provider device or plurality of devices is provided with at least one policy agent. The policy agent of each of the service provider devices is placed in communication with a security service system. The method includes detecting an improper network event using one of the policy agents and providing the security service device associated with that policy agent/service provider device with vector data characterizing the improper network event. The method further includes forwarding the vector data relating to the improper network event from the security service system to other of the security service systems, and from those to the policy agents in the other service provider devices. The method then inhibits the transfer of messages, data, or other forms of traffic corresponding to the vector data.

18 Claims, 12 Drawing Sheets

(52) U.S. Cl.
CPC ........ *H04L 63/145* (2013.01); *H04L 63/1408* (2013.01); *H04L 63/1475* (2013.01); *H04L 63/20* (2013.01)

(58) Field of Classification Search
USPC .......................................................... 726/1
See application file for complete search history.

(56) References Cited

U.S. PATENT DOCUMENTS

| | | |
|---|---|---|
| 2010/0205657 A1 | 8/2010 | Manring et al. |
| 2010/0251327 A1* | 9/2010 | Channabasavaiah ................ H04L 67/2809 726/1 |
| 2011/0138468 A1* | 6/2011 | Chaudhry ............. G06F 21/552 726/24 |
| 2013/0097658 A1* | 4/2013 | Cooper ............... H04L 63/0227 726/1 |
| 2014/0047542 A1* | 2/2014 | Holloway ........... H04L 63/1458 726/23 |

* cited by examiner

SYSTEM AND METHODS FOR REDUCING IMPACT OF MALICIOUS ACTIVITY ON OPERATIONS OF A WIDE AREA NETWORK

CROSS REFERENCE TO RELATED APPLICATION

This application claims the benefit of U.S. Provisional Application No. 61/990,569, entitled "System and Method for Controlling Deviant Activity in a Wide Area Network," filed May 8, 2014, which is incorporated herein by reference in its entirety (including Appendix) for all purposes.

BACKGROUND

Computing and data entry devices are coupled by means of communications networks that facilitate communication between computing devices and users throughout the world. Communications networks may be of a variety of sizes, depending on the number of connected devices and the purpose of the network (e.g., whether it is for private, local, or general public use). Communications networks that are operated by Service Providers (SPs) or Internet Service Providers (ISPs) may be used to permit relatively large numbers of users to connect with remote servers hosting web-sites and with individual users. Such networks are inter-connected via circuits, where the size of a circuit determines the amount of data that can be transmitted or received during a specific time interval. The process used to facilitate communication between computing devices and users is known as "routing". Routing occurs when data and/or a message are passed from a source to a destination over inter-connected networks.

While there are many beneficial aspects of communications networks, such networks may also be used for improper purposes. For example, such networks and computing devices may be the targets of, or used for, deviant or anti-social purposes such as malicious attacks on networks, computing devices, web sites, or network infrastructure elements. One such misuse or deviant use is that of perpetrating a Distributed Denial of Service attack (DDoS), which is the transmission of unwanted messages in such a quantity or crafted in such a way as to render a legitimate service unusable. Other types of (deviant/illegal) activity include attempts to obtain unauthorized access to confidential information (such as occurs in email "spamming") or attempts to commit financial fraud, such as occurs as part of the practice known as "phishing".

When such improper behaviors are detected or identified, there are several conventional approaches to addressing the attempts to commit such behaviors and/or mitigating their impact. Typically these approaches include one or more of:
  Null Routing: redirecting traffic from the destination to a
    null address in memory, often called a "Black Hole" or
    "black hole routing".
    While effective, this approach has a possible deficiency
      in that when malicious traffic volume is too great, the
      destination service provider may not have sufficient
      bandwidth or equipment capable of null routing all
      aspects (i.e., incoming messages) of the attack on
      their own;
  Reverse Proxying: the action of a cluster of systems
    serving as the front line of defense and operating to
    pass only known legitimate traffic to the destination.
    This may be effective, at least initially, but suffers from
    the following deficiencies:
      1) Depending on the type of attack, a proxy or cluster
        of proxy servers may not be able to handle the flow
        of traffic or the number of connections per second
        required to prevent the attack from overwhelming
        them and their ability to prevent the messages reaching their intended target; and
      2) When malicious traffic volume is too great, the
        destination service provider may not have sufficient
        bandwidth equipment capable of null routing all
        aspects (i.e., incoming messages) of the attack on
        their own.
  Filtering: in specific types of attacks or situations of
    unwanted traffic where a connection oriented session
    occurs (i.e., when a server requires two-way communication), a system can filter known illegitimate source
    addresses or messages based on their content. While
    targeted, this may not be successful due to one or more
    of the following:
      1) Depending on the type of attack, a proxy or cluster
        of proxy servers may not be able to handle the flow
        of traffic or the number of connections per second
        required to prevent the attack from overwhelming
        them and their ability to prevent the messages reaching their intended target;
      2) When malicious traffic volume is too great, the
        destination service provider may not have sufficient
        bandwidth equipment capable of null routing all
        aspects (i.e., incoming messages) of the attack on
        their own; and
      3) Some types of content can be formatted to appear as
        legitimate traffic and may originate from a multitude
        of sources—in such cases, the method may not be
        effective.
  Scrubbing: this technique examines network packets in
    relation to their respective protocols, and only allows
    packets matching what would normally exist in the
    context of a specific connection or session. This
    approach may have one or more of the following
    deficiencies:
      1) Depending on the type of attack, a proxy or cluster
        of proxy servers may not be able to handle the flow
        of traffic or the number of connections per second
        required to prevent the attack from overwhelming
        them and their ability to prevent the messages reaching their intended target; and
      2) When malicious traffic volume is too great, the
        destination service provider may not have sufficient
        bandwidth equipment capable of null routing all
        aspects (i.e., incoming messages) of the attack on
        their own.

Note that in some respects, all of these conventional methods suffer from a common problem; that of being unable to respond properly and in a timely manner to a large enough volume and/or rate of malicious messages or data. Thus, all are effectively rendered less useful or in the end ineffectual if the amount of data used in an attack exceeds the capabilities of one or more of the routing devices, the processor's computing resources, or the bandwidth limitations of one or more of the circuits the data is carried over.

Embodiments of the invention are directed toward overcoming the disadvantages and limitations of conventional approaches to addressing the detection of and response times to attempts to carry out such illegal and/or undesirable activities, and solving the problems created by such activities, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

In some embodiments, the invention is directed to systems, elements, and methods that may be implemented in order to detect attempts at malicious activity within a communications or computing network, and responding in a manner that limits the spread of the improper/deviant activity within the network. In some embodiments, this is achieved by introducing a control layer or architecture to a group of Service Providers and their associated network elements and users. This architecture provides a mechanism for rapidly communicating evidence of malicious activity between Service Providers or groups of Service Providers. In some embodiments, metadata describing characteristics of an attack may be distributed among the Service Providers, who in response may implement measures to prevent their network elements and users from being used to implement a denial-of-service (DoS) or distributed denial-of-service (DDoS) type of attack.

As recognized by the inventor, this approach takes a different perspective on how to provide an effective response to a DoS/DDoS type of attack than do conventional approaches; rather than concentrate on preventing malicious traffic from reaching its intended target near to the target's network elements, a potentially more effective approach is to provide a mechanism for controlling the ability of other devices to be used to send traffic onto the larger network from a place on the network that is closer to those misappropriated devices. This has the benefit of preventing malicious traffic closer to its source and before it utilizes other resources for purposes of transmission to its intended target. Further, in some cases, network elements closer to the misused devices may be able to collect and analyze data that could provide a fingerprint of the entity behind the malicious activity and lead to it being identified. In some respects, embodiments of the invention permit the control of malicious activity and the implementation of broader policies to occur away from the intended target and more locally to the sources of the undesirable traffic. This type of control reduces the use of network resources by the malicious actor and also reduces the likelihood that the malicious activity will be able to overwhelm the capabilities of the network elements closer to the intended target.

In one embodiment of the invention, a system for controlling malicious or deviant network activity in a wide area network includes multiple Service Provider (SP) or Internet Service Provider (ISP) devices (such as network servers, gateways, routers, switches, or other forms of network elements) that are configured to provide communications service to and between attack vector devices (such as end user communications and computing devices). Each Service Provider device includes/executes an element or process which sends data about communications flows traversing the network devices to a policy agent element or process. The system includes one or more Security Service Systems (or the functional equivalent, such as a Regional Cluster, a group of Regional Clusters, or other form of more centralized grouping of Service Provider networks/devices), where the policy agent(s) element or process of each of the plurality of Service Provider networks/devices is in communication with one or more of the Security Service System(s).

Each policy agent element or process is configured (by default and/or by execution of a specified rule set) to detect improper network events or deviant activity by application of a suitable set of rules, threshold values, or other suitable comparison and/or decision mechanism. In the case of using a set of rules, the rules may be written specifically to detect certain types of network traffic or events. The rules may specify a threshold value, which when matched or exceeded, causes a notification to be sent to the appropriate Security Service System(s). The notification may contain information or data regarding the threat or attack in the form of (attack) vector data, which is typically a destination IP address or IP Prefix (i.e., a block of IP addresses). Each of the Security Service System(s) are configured to forward (either directly, or indirectly via an intermediate node) the vector data relating to the network traffic/event to the policy agents in each of the plurality of Service Provider devices that are part of the larger network or sub-network being monitored and protected. The policy agents in the Service Provider devices are configured to receive the vector data, process it, and in response to inhibit traffic corresponding to (i.e., destined for or intended for) the nodes, elements or devices having the characteristics of the vector data received from the Security Service Systems (i.e., the intended target or targets of the attack).

In this way an improper, deviant, or malicious event that is directed at, intended for, or detected at one Service Provider device may be characterized and that information provided to multiple other Service Provider devices through the operation of the Security Service System(s). This enables the other Service Provider devices to block or neutralize attempts to implement the improper, deviant, or malicious event at their respective devices, thereby preventing the traversal of the attack related data over the Internet (or other large scale network). This helps to protect Service Provider networks (which are sub-networks of the overall Internet) from collateral damage related to the intensity of an attack or malicious action.

In another embodiment of the invention, a method is described for controlling improper/deviant/undesirable network activity in a wide area network that includes multiple Service Provider devices configured to provide communications services to and between attack vector devices. Each Service Provider device is provided with a policy agent. The policy agent of each of the Service Provider devices is configured to be in communication with a Security Service System(s). The method includes detecting an improper network event using one of the policy agents and providing the Security Service System associated with that policy agent with vector data characterizing the improper network event. The method further includes forwarding the vector data relating to the improper network event from the Security Service System to other of the Security Service Systems, and from those to the policy agents in the other participating Service Provider devices. The method then calls for automatically inhibiting the transfer of messages, data, or other forms of traffic corresponding to the vector data in order to protect devices in communications with the Service Provider devices.

In one embodiment, the invention is directed to a system for controlling the impact of improper network activity on the operations of a wide area network, where the system includes:

a plurality of service provider devices, each service provider device configured to provide communications and data transfer services to a plurality of potential target devices associated with the service provider device, wherein each service provider device includes a policy agent element or process;

one or more security service devices, wherein the policy agent element or process of each of the plurality of service provider devices is communicatively coupled to at least one of the one or more of the security service devices;

wherein each policy agent element or process is configured to detect an improper network event, and in response to provide the security service device or devices to which it is communicatively coupled with data relating to the improper network event;

wherein each of the one or more security service devices is configured to forward received data relating to an improper network event to one or more of the policy agent elements or processes that are communicatively coupled to the security service device, thereby providing the data relating to the improper network event to each service provider device that includes one of the one or more of the policy agent elements or processes that are communicatively coupled to the security service device; and wherein upon receipt of the data relating to the improper network event, the policy agent elements or processes are configured to cause the service provider device with which they are associated to inhibit the transfer of traffic intended for a target device identified by the data.

In another embodiment, the invention is directed to a method of controlling the impact of improper network activity on the operations of a wide area network, where the method includes:

operating a node of a communications network to identify a target or intended target of an improper network activity;

providing data characterizing the target or intended target to a network node that is communicatively coupled to the node identifying the target or intended target;

operating the network node that is provided with the data so as to distribute the data to one or more network nodes that are not as closely communicatively coupled to the node identifying the target or intended target; and configuring one or more network nodes of the nodes that are not as closely communicatively coupled to the node identifying the target or intended target to operate so as to prevent sending or transferring traffic to the target or intended target.

In yet another embodiment, the invention is directed to a system for reducing the negative impact of improper network activity on the operations of a wide area network, where the system includes:

a plurality of service providers, with each service provider being associated with a set of devices for which the service provider provides communications and data transfer services, and further wherein each service provider is associated with one or more routing, switching, or security devices;

a policy agent element or process associated with each service provider, wherein each policy agent is configured to peer with the policy agent element or process associated with a different one of the plurality of service providers;

wherein each of the security devices is configured to send network flow metadata and security information to the policy agent element or process associated with the service provider that the security device is associated with; and wherein each policy agent element or process is configured to respond to data indicating an improper network activity by causing each security device associated with the service provider with which the policy agent element or process is associated to inhibit the improper network activity directed toward a target or intended target identified in the network flow metadata and security information.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
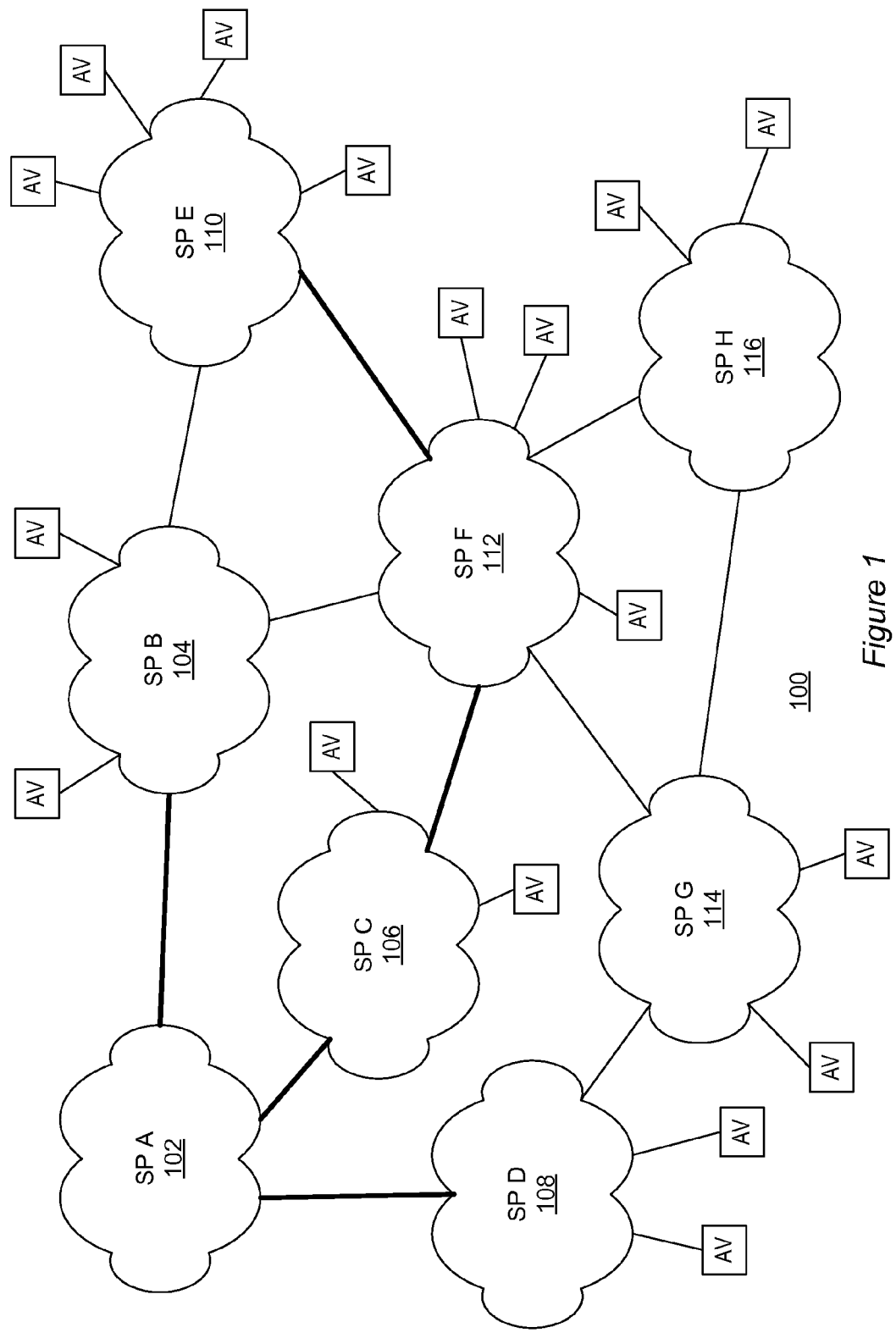
FIG. 1 is a diagram illustrating an example of a wide area network (WAN) system subjected to a distributed denial of service (DDoS) attack, and indicating examples of overloaded circuits connecting some of the SP networks (as suggested by bold lines)

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, a device or network security protocol, process, or application, a gateway server, a mail server, a communications network node, a firewall element or process, or other form of computing or data processing device, apparatus, or platform, and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the invention is directed to systems, elements, and methods that may be implemented in order to detect attempts at malicious activity within a communications or computing network, and responding in a manner that limits the spread or impact of the improper/deviant activity within the network. In some embodiments, this is achieved by introducing a control layer or architecture to a group of Service Providers and their associated network elements and users. This architecture provides a mechanism for rapidly communicating evidence of malicious activity between Service Providers or groups of Service Providers. In some embodiments, metadata describing characteristics of an attack may be distributed among the Service Providers, who in response may implement measures to prevent their network elements and users from being used to implement a DDoS type of attack.

The inventive approach takes a different perspective on how to provide an effective response to a DDoS type of attack than do conventional approaches. Rather than concentrate on trying to intercept malicious traffic near to the intended target's network elements (which may place an unrealistic burden on and lead to the failure of such elements, thereby operating to delay but not prevent the attack), the inventive and potentially more effective approach is to provide a mechanism for controlling the ability of other devices to be used effectively to send traffic onto the larger network from a place on the network that is closer to those devices. This has the benefit of preventing malicious traffic closer to its source and before it utilizes other resources for purposes of transmission to its intended target(s).

As recognized by the inventor, attempting to control the negative impacts of a DDoS or other type of malicious activity by preventing delivery of messages relatively close to the intended target is not the most efficient or effective way of handling this situation. Conventionally, by taking actions close to the intended target, at least two other problems related to the attack may be caused or made worse: (1) the malicious traffic will have been transported over a larger set of network connections and infrastructure elements before being controlled—this may have infected or caused operational problems with other aspects of the larger network, and at the least was a misuse of network resources; and (2) the volume of messages associated with an attack may be relatively large, and requiring them to be controlled or mitigated by a smaller number of network resources (such as those nearer to the endpoint target) may increase the likelihood of a failure of one of those elements and/or of the element being overwhelmed and in effect bypassed by the attack.

Thus, in some respects, embodiments of the invention permit the control of malicious activity and the implementation of broader policies to occur away from the intended target and more locally to the sources of the undesirable traffic (i.e., those elements being used as sources of malicious traffic). This type of control reduces the use of network resources by the malicious actor and also reduces the likelihood that the malicious activity will be able to overwhelm the capabilities of the network elements closer to the intended target. Further, in some cases, network elements closer to the misused resources/devices may be able to collect and analyze data that could provide a fingerprint of the entity behind the malicious activity and lead to it being identified.

Note that in some respects there are two at least primary functional aspects to embodiments of the inventive system and methods: (1) a communications network architecture that enables data characterizing an improper network event to be communicated to a (typically, but not required to be) higher level of an overall network hierarchy or structure, and from there to be distributed to other nodes or groups of nodes within the larger network; and (2) a process to use the data to identify an intended target of the improper event and to prevent the sending of messages/data (and/or to redirect messages/data attempted to be sent) from network nodes/devices/elements to that target.

In some embodiments, the invention is directed to systems, apparatuses, and methods for reducing the negative impacts within a computing/communications network of an illegal and/or malicious activity directed against a device, computer, user, server, or node of the network. In some embodiments, information characterizing an improper activity that is directed against a device, computer, user, server, or node of a wide area network (such as a service provider network element or associated service provider or user device) is communicated to other nodes in the network.

Note that a multi-homed network (i.e., a network having more than one SP connection) in which one or more (but not all) of the connections are fully saturated, and where at least one of the not fully saturated connections is connected to an SP which is participating in the inventive system will enable a local SP to receive the information necessary to help block or mitigate the attack.

In these and other use cases, the information itself may be represented by a "vector" that is used to communicate the information and assist in its interpretation. In some embodiments, the vector may include metadata representing one or more parameters indicative of improper activity, one or more parameters characterizing the targeted network node or element, or other potentially relevant or applicable data.

An exemplary implementation of an embodiment of the invention will be described in the context of a wide area network (WAN) that includes a plurality of network nodes, where the nodes include a plurality of Service Providers (referred to as "SPs", which operate to provide message and data routing and switching services between other SPs and their respective end-users and computing devices. The network may also (or instead) include a plurality of servers acting as gateways for use in facilitating communications and data transfer between communications networks (such as between a wired and a wireless network) or between groups of network nodes (such as between sub-networks or clusters of elements that are part of a larger network), control elements that operate to permit or reject messages/data packets, or other forms of network administration and control nodes or elements.

FIG. 1 is a diagram illustrating an example of a wide area network (WAN) system subjected to a distributed denial of service (DDoS) attack, and indicating examples of overloaded circuits connecting some of the SP networks (as suggested by bold lines). Wide Area Network (WAN) 100 is constructed of a plurality of Internet Service Providers (SP or ISP) 102, 104, 106, 108, 11, 112, 114, and 116 that are distributed across a geographic area and interconnected to provide networked communication and data transfer between attack vectors served by the SPs (where typically an attack vector represents one or more of a user device, network element, router, etc.), with each SP possessing a unique Autonomous System Number (ASN). For example, SP A 102 may be located in Europe, SP F 112 may be located in North America, and SP H 116 may be located in Asia. Each SP typically provides services to a large number of attack vectors, such as client computers, servers, network elements, and mobile devices. Hackers and others intent on malicious activity may be able to install malicious/harmful software applications or code on multiple attack vector devices. This is typically done in order to "infect" the attack vector devices or otherwise cause the devices to exhibit undesired (by the users or network administrators) behavior. Examples of such undesired behavior include (but are not limited to, or required to include) collecting private data, sending undesired messages (as part of a SPAM attack or DDoS effort), or installing botnet code that enables the hacker to remotely (and often surreptitiously) control the attack vector device. In a typical case, hundreds, thousands, or hundreds of thousands of attack vector devices may be infected with such malicious code.

One particular example of an undesired/deviant behavior is a DDoS attack, in which a hacker typically controls thousands or tens of thousands of infected attack vectors/devices and causes them to send messages to a target location as a group, and substantially simultaneously. This has the effect of overwhelming the target's processing capacity and preventing the target from processing or responding to legitimate message traffic. As a result, the affected device, server, node, website, or other network resource becomes unavailable for use by the intended users. In some cases, this may temporarily prevent a user or business from being able to operate, or at least being able to operate in an effective manner.

Other examples of deviant and hence improper behavior that may be caused to occur within a computer or communications network are spam (e.g., unsolicited bulk or junk email, which typically involves sending nearly identical messages to a large number of recipients), phishing (e.g., messages designed to fool recipients into sharing sensitive personal information, such as account numbers, passwords, etc.), and cracking (e.g., collecting information related to networks for use in breaking passwords or encryption protection on the network, in order to penetrate the network's security or exploit weaknesses in software or access controls, thereby enabling access to confidential data). These are but a few examples of criminal or questionable activity in which the actions of a malicious actor can have an adverse effect or create an undesirable situation with regards to the availability and/or usability of a resource or service by legitimate users.

Conventional network elements and systems, such as Layer 3 IP backbone routers, typically include some form of basic functionality for exporting network flow data, which may be used to diagnose operational problems within the network. Examples of the network flow data exported by these devices include NetFlow (made popular by Cisco), sFlow (by InMon corporation), and IPFIX, which is an open protocol. Another conventional approach used to diagnose network problems is the use of packet duplication, wherein port mirroring is used on a network switch to send a copy of network packets seen on one switch port (or an entire VLAN) to a network monitoring connection on another switch port.

In some cases, network flow data may be analyzed to determine when and if a system or network is the subject of a DDoS attack. As described herein, DDoS attacks can sometimes be mitigated at the receiving SP via filtering or blocking efforts; however, as recognized by the inventor, the volume of deviant network activity is reaching a level at which it cannot be effectively mitigated or handled using conventional approaches (at least not with the desired level of successful intervention).

In the example of FIG. 1, Service Provider (SP) A 102 represents an SP with at least one Node or Network under attack. As a result, infected attack vectors connected to SPs throughout WAN 100 are sending messages to a Node or Network on SP A 102. As the attack vector messages are routed toward the target, network resources such as communication links (in this example) become saturated with message traffic, as indicated by the heavier black line connections, and prevent or impede legitimate traffic on those communications links. In the example of FIG. 1, the communication links between SP A 102 and SP B 104, SP C 106, and SP D 108 are saturated, as well as the link between SP C 106 and SP F 112.

Note that because the improper/deviant message traffic may originate from devices spaced throughout the world, with each sending a comparatively small number of messages (and most often employing source-spoofing technology), it may be difficult or impossible for the SP's that service the misappropriated devices to determine that they are being used as part of a coordinated attack (this is especially difficult in the case of not having sufficient knowledge of the characteristics of an attack).

Another problem in detecting and mitigating the impact of a DDoS attack, is that an approach centered on preventing messages or data from reaching an intended target may be overwhelmed by the sheer volume of improper messages before appropriate steps can be taken to detect and respond to an attack (where hopefully this response occurs within a timeframe sufficient to prevent collateral damage to systems and networks neighboring the intended target and/or to prevent the attack from having a negative impact on the operation of other nodes of the network).

As recognized by the inventor, this is one of at least two significant difficulties in detecting and responding to a DDoS attack: (a) knowledge of the identity of the sources of malicious traffic may not be available quickly enough to prevent harm; and (b) acting to block delivery of malicious traffic relatively "near" to the target or targets risks the overwhelming of the network resources used for that purpose (such as routers, communications channels, processing elements, etc.) and hence may only serve to delay the impact of the attack. Embodiments of the inventive system and methods operate to overcome these obstacles and provide an effective and resource efficient approach to addressing the problems caused by and in mitigating the negative impacts of DDoS attacks.

In a typical conventional system response to a DDoS attack, the target SP A 102 identifies the destination address of the attack by analyzing NetFlow, SFlow or IPFIX data. The SP then null routes the destination IP prefix by adding a tag (e.g. "666") to the routing tables of the routers of the SP that causes messages with the destination prefix and tag "666" to be routed to a null address, effectively "dropping" the packets. The target SP also typically notifies upstream and peer SPs of the destination prefix and may ask for assistance, which is often in the form of a manual request from the administrator of the target SP to the administrators of the other SPs. The upstream transit providers and peers then null route the destination prefix in their own routing tables and, in turn, contact their own upstream transit providers and peers to request that the destination prefix be null-routed in those SPs. Such a conventional response may require intensive management and significant time, e.g., minutes, hours, or days, during which the functioning of the target SP for its intended uses may be significantly impaired.

In contrast and in order to overcome the limitations and disadvantages of the conventional approach(es), in one embodiment of the inventive system and methods, each SP owner is registered with a centralized network security service (which may include a single node/platform or a coordinated group of nodes, elements, platforms, processing elements, etc.) and have installed an instance of a "policy agent" as part of the infrastructure of the SP. Each policy agent is authenticated with the centralized network security service using public and private key pairs generated when the SP registers with the centralized network security service. Each SP configures their routers and other devices to direct their NetFlow, SFlow, or IPFIX data (or other form of flow data) to the SP's corresponding policy agent. The SP places its private key of the authentication key pair in its policy agent and registers the prefixes (also known as IP blocks) that the SP may announce to the centralized network security service using that key. This provides the policy agent with a form of non-repudiation from the standpoint of the centralized network security service server(s), and prevents a policy agent at one SP from being able to impersonate the policy agent of another SP.

In an optional embodiment/implementation, the SP may receive a set of local or global community filtering rules to add to its list of network anomalies to detect and/or respond to. In another option, the rules or information provided by the centralized network security service may "tune" the threshold values for one or more of the community rules, or permit the SP network administrator to tune those values to provide more control over network operations. Note that other sets of rules may be available and can include rules specifically tailored to the particular SP, local cluster of SPs, or subscription based rule sets (where a subscription based rule set may be a commercial rule set which can help organizations determine not only various types of threats, but also analytics for purposes of capacity planning and meeting regulatory compliance).

A rule set is typically a combination of a rule and a threshold value, and sometimes a secondary or sub-rule. For example, an exemplary rule set for a "volumetric based" DDoS attack might take the form of the following:

Rule: select sum(bytes) from ddos_table where interface="ingress" and start_time=(now( )−30 s) and end_time=now( );
Threshold: 980000000 bps
SubRule: select count(*) as flows, ip_dst from ddos where start_time=(now( )−30 s) and end_time=now( ) group by ip_dst order by flows desc.

The result of applying such a rule would be to yield the amount of data (in bytes) transferred on an interface(s) representing ingress traffic (where all ingress interfaces have a total capacity of 1000000000 bps) to the SP over the previous 30 seconds. The rule may be compared to the last 30 seconds of aggregate traffic as many as 10,000 times per second, depending on the computational speed of the policy agent. The result may then be compared to a threshold value or to a growth rate (a rate of increase measure). If the threshold value or specified rate of increase is reached, then the SubRule is executed, which identifies the target of the attack.

An exemplary rule set for a "packet per second based" DDoS attack might take the following form:

Rule: select ingress, round(sum(packets)/30, 2) as pps from pps_table where interface="ingress" and start_time=(now( )−30 s) and end_time=now( );
Threshold: 1900000 pps
SubRule: select count(*) as flows, ip_dst from ddos where start_time=(now( )−30 s) and end_time=now( ) group by ip_dst order by flows desc.

The result of applying such a rule would be to yield the average number of packets per second transferred on an interface(s) representing ingress traffic to the SP over the previous 30 seconds. The rule may be compared to the last 30 seconds of traffic as many as 10,000 times per second, depending on the computational speed of the policy agent. The result may then be compared to a threshold value or to a growth rate (a rate of increase measure). If the threshold value or specified rate of increase is reached, then the SubRule is executed, which identifies the target of the attack. Internal logic may then be used to determine if the attack is destined for a single address, or for a number of addresses associated with the SP. Whether a single address or multiple addresses are determined to be the destination of the attack, a "prefix" is determined. The "prefix" then serves as the "subject" of the security event discovered by application of the rule set.

In some embodiments, the policy agent may be configured to monitor network traffic and provide "intelligent" recommendations regarding a suitable, desirable, or optimal threshold to use when implementing one or more of the rules. By analyzing traffic patterns, a policy agent may maintain a table or list of the various destinations serviced by the SP. Using statistical analysis or another suitable technique (such as machine learning), the patterns of communications may be stored in an aggregated format which can be used to predict the "normal" or "expected" traffic patterns. These can be presented to the network administrator as suggestions when configuring thresholds for one or more of the various rules. This form of adaptive or feedback control of the rule set used to detect a DDoS attack may be useful for "tuning" the response of the inventive system to better detect such attacks.

Note that in some embodiments, the target destination prefix may be communicated to one or more other of the regional clusters, or to one or more security service systems or sub-systems. However, typically, the regional cluster redistributes the null route for the target destination prefix to the other SPs participating in the security service for the larger network.

In a further embodiment or refinement of the inventive system, the Security Service System(s) may be configured to receive and analyze the metadata provided by the routing and switching devices on a Service Providers network. In this embodiment, a specific protocol may be enabled on the network routing and switching devices to enable source identification of directly attached and infected attack vector devices. In this use of the invention, information regarding the infected devices is sent to the Security Service System(s), and in response the participating policy agents are instructed to configure the local Service Provider's routing and switching devices and processes to block access to the Internet (or to another network or sub-network) by the devices identified as being infected attack vector devices.

In another embodiment, the Security Service System(s) may be configured to analyze the metadata provided by the protocol to identify infected attack vector devices, and in response to provide a report to the Service Provider device that identifies the infected attack vector devices that are connected to (and provided services by) that Service Provider device. In yet another embodiment, the policy agents may be configured to download at least one of a set of community rules, a set of customized rules, or a set of subscriber rules to each of the policy agents. A rule may be comprised of a definition with thresholds which are compared to an aggregate database of information regarding recent and current flows reported by the Service Providers routing and switching devices. Rules may be used to trigger a notification or action upon the detection of various types of traffic anomalies and/or satisfaction of one or more conditions or criteria.

In yet another embodiment of the invention, a system for controlling malicious/deviant network activity in a wide area network may include Internet Mail Service Providers which function to receive and process incoming messages and route the messages to the intended recipient of the message, and to receive and process outgoing messages and route them to their intended recipient, and the associated routing, switching and security devices (sometimes referred to collectively as Service Devices). The Service Devices are configured to send network flow metadata and security related information (which may be referred to as Network Security Information) to a hardware element and/or software program (which may be referred to as a "policy agent"). The policy agent is configured to operate as a peer or neighbor with the Service Devices, and is programmed to receive data regarding/relating to security events and to identify an attack vector or network device which represents the intended destination or target of the security event/attack. In some cases this may be a server which has been identified as sending SPAM emails.

In response to such detection, the policy agent operates to enable configuration of "neighboring" Service Devices in order to inhibit outbound communications to the SPAM target/service, thereby eradicating the deviant activity directed towards the destination/target and redirecting it to other destinations within a larger network. Note that this ability is made possible at least in part because Internet email uses the TCP protocol, which requires two-way communications.

In some embodiments, the configuration of Service Devices may include generating and transmitting notifications or alerts to neighboring Regional Neighbor Clusters of the intended target or destination, where the notifications/alerts may include security event information. The security event information may include data characterizing and/or permitting identification of malicious messages or data. The Regional Neighbor Clusters may redistribute the security event information to other Regional Neighbor Clusters, as part of a peer network. Regional Neighbor Clusters in turn operate to propagate the specified security event information to policy agents at participating Service Providers, which in turn operate to configure Service Provider Devices to participate in inhibiting the spread of malicious/deviant network activity directed towards the original destination. This can be accomplished when a Service Provider Device has been configured by the policy agent to control/respond to a security event by dropping or re-routing network packets that are identified/characterized by the information contained in the security event information.

In a refinement of this embodiment of the inventive system, a unidirectional protocol may be implemented on the Service Devices. In addition to dropping the network packets, a Service Device may operate in accordance with this protocol to send a stream of packet metadata information (in the form of a Signed Packet Metadata Stream Protocol). A signed packet may have the following representation in the C programming language, and may include additional information

```
struct wanscads_packet {
    unsigned int length;      /* packet length */
    unsigned int protocol;    /* IP Protocol type */
    signature;                /* remote AS crypto hash */
    router_id;                /* remote AS unique router-id */
    unsigned int iface_id     /* Interface ID of router_id */
    ip src_ip;                /* Source IP Address */
```

```
ip dst_ip;              /* Destination IP Address */
unsigned int ttl;       /* TTL val of original packet */
hw_mac;                 /* Source MAC */
unsigned int src_port;  /* TCP/UDP source port */
unsigned int dst_port;  /* TCP/UDP destination port */
unsigned int tcp_flags; /* TCP flags */
unsigned int tos;       /* IP type of service */
}
``` regarding the sent and received packets on the port of each infected device to either the local policy agent and/or Regional Neighbor Clusters. The Signed Packet Metadata Stream Protocol information is then tagged with a Security Event ID and stored. Security Event Reports may be compared against the stored data to identify attack vectors and devices which have participated in a security event. Attack vectors and devices listed in a Security Event Report which did not exhibit deviant behavior in connection with the security event may be removed from the report, with the resulting report being used as the Attack Vector Report.

In another embodiment of the inventive system and methods, the Attack Vector Report may be processed into sub-reports grouped by Service Provider. The resulting sub-reports may be presented to the Service Providers, and the Service Providers requested to operate to disable or restrict the level of network communications to what is needed to facilitate the elimination of the threat of further deviant behavior (as that behavior may be propagated by the attack vector or device listed in the Attack Vector Report).

In a refinement of certain embodiments of the inventive system and methods, a bi-directional Protocol (referred to herein as "Protocol V2") may be implemented on some or all of the Service Devices. This protocol (Protocol V2) allows an organization/entity that is administering and/or maintaining the inventive system and methods to remotely enable the Signed Packet Metadata Stream Protocol and gather information regarding network activity associated with an attack vector or device identified in the Attack Vector Report or determined to be a risk as a result of a Security Event. This functionality may allow the Security Service Systems to collect sufficient data to determine the actual or most likely source of the attack vector controller. Protocol version 2 expands on Protocol version 1 (as described previously) in that it can be remotely enabled by the Regional Neighbor Clusters, thereby enabling "Triangulation" of the source attack vector.

In some embodiments of the inventive system and methods, a port of the attack vector or device identified as the attack vector may be monitored by remotely enabling Signed Packet Metadata capabilities for the port. This could be a feature of the software on the routing and switching device(s), and would enable the security service protocol once the device determines that it is forwarding data destined for the attack destination. The resulting Packet Metadata may be used to identify the origin of the deviant behavior at the level of a Service Provider, Service Device, Port and/or other relevant system identifiers (such as the MAC or IP address of the Attack Vector). After the true sources are determined, the regional security clusters aggregate the data in the form of a report and send each SP a report of the compromised hosts on its network.

In one implementation, the null-routing request containing the target destination prefix is distributed using the Border Gateway Protocol version 4 (BGPv4), which permits routing information to be exchanged between autonomous systems (such as SPs) on the Internet (note that BGP is the protocol that is used to route communications information between SPs over the Internet). In some embodiments, BGPv4 is the protocol used for communications and data transfer between the policy agents and the SP clusters.

In response to receiving the null-routing request, the other participant SPs null route the target destination prefix at their edge servers and/or edge and core routers. This has the effect of null routing traffic sent from infected attack vectors (such as other devices in the network) to the target destination prefix, thereby substantially neutralizing the impact of the attack on the network as a whole (by preventing other SPs from being used to contribute to the attack) and making Intra-net or Internet traversal of the attack impossible over the participating SPs. Note that in order to account for a possible misconfiguration event (e.g., arising from an error in data or the decision processes of the target SP involved in the attack), it may be possible for the target SP to send a "reset message" after detecting an error, and thereby instruct the other participating SPs to remove the null route for the target destination prefix.

In one embodiment, the policy agent in a SP associated with a targeted attack vector may respond to a rule that produces an output reaching the threshold value (e.g. reaching 98% capacity of a Gigabit circuit) by tagging a prefix with an identifier (e.g. "666"), which instructs participating devices to local null or "blackhole" route the destination prefix or subject of the attack. The local kernel, which is recognized by the operating system (OS), then updates the local routing table to tag the prefix, and null routes the destination prefix. The update to the blackhole route map is distributed to the routers of the SP through internal BGP (iBGP) or other suitable protocol. The policy agent sends the update to a centralized security server, which utilizes External BGP to tag the prefix using a BGP community to "push" the update to the rule to the other participating SPs, who may then tag the route as appropriate for the particular SP or ISP. Note that each SP or ISP may have its own method and strategy for dealing with tagged routes, e.g., one ISP may use "666" to blackhole null route while another uses e.g. "999". In one sense, the inventive architecture and system acts as a bridge between policy agents, allowing each policy agent to conform to the local SP black hole routing schema or tagging system. When the policy agent has determined a prefix is the subject of an attack, it tags that prefix using the appropriate tag or method for the associated SP's black hole routing schema. Internal BGP is then used to "push" the updated tagged route to the routers in each SP or SP cluster.

Figure 2:
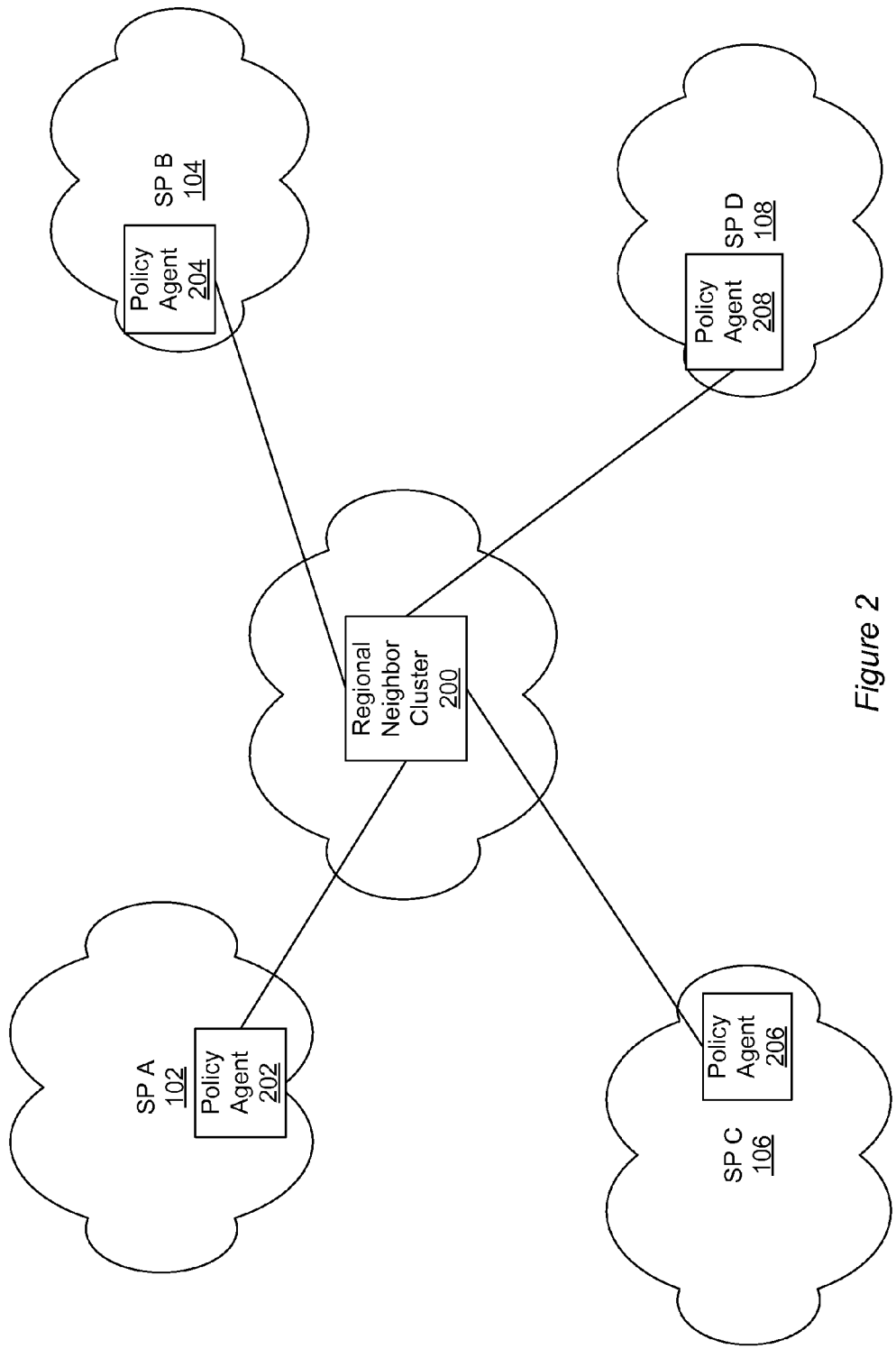
FIG. 2 is a diagram illustrating an example of a WAN system configured to respond to a security event such as a DDoS attack, in accordance with at least one embodiment of the invention.

FIG. 2 is a diagram illustrating an example of a WAN system configured to respond to a security event such as a DDoS attack, in accordance with at least one embodiment of the invention. In this example, a policy machine or software agent which has interfaces and computation resources capable of decoding NetFlow, Sflow, IPFIX, and port mirrored data is downloaded and installed on each of the participating SPs in the system, with each policy agent being communicatively coupled to one or more security servers. In this example, SP A 102, SP B 104, SP C 106 and SP D 108 are shown with their respective/corresponding policy agents 202, 204, 206 and 208 being connected (in the sense of being capable of communication, message exchange, and data transfer) to security server 200. Note that the other participating SPs in the WAN will also have a policy agent installed. In some embodiments, the "security server" may consist of multiple servers or services, such as might be part of a regional neighbor cluster for each of several regions, with the regional neighbor clusters in communication with one another and/or with a central security server.

Note that some SPs may be very large with correspondingly large amounts of traffic volume, such that even processing samples of network flow metadata may be an unrealistic task for a single policy agent. In these cases multiple policy agents may be configured at strategic points in an SP's network and these policy agents could then peer with a centralized network security system. In some embodiments, a feedback mechanism might be used to suggest more optimal clusters or groupings, so that the process of forming clusters itself could be dynamic and adaptive. This might provide a benefit in terms of increased security because attacks aimed at disrupting the operation of a cluster of SPs would be less effective, making the WAN more resistant to certain threats, etc. (as clusters are formed and then reformed in different groupings in response to attacks, threatened attacks, WAN operating conditions, etc.).

Figure 3:
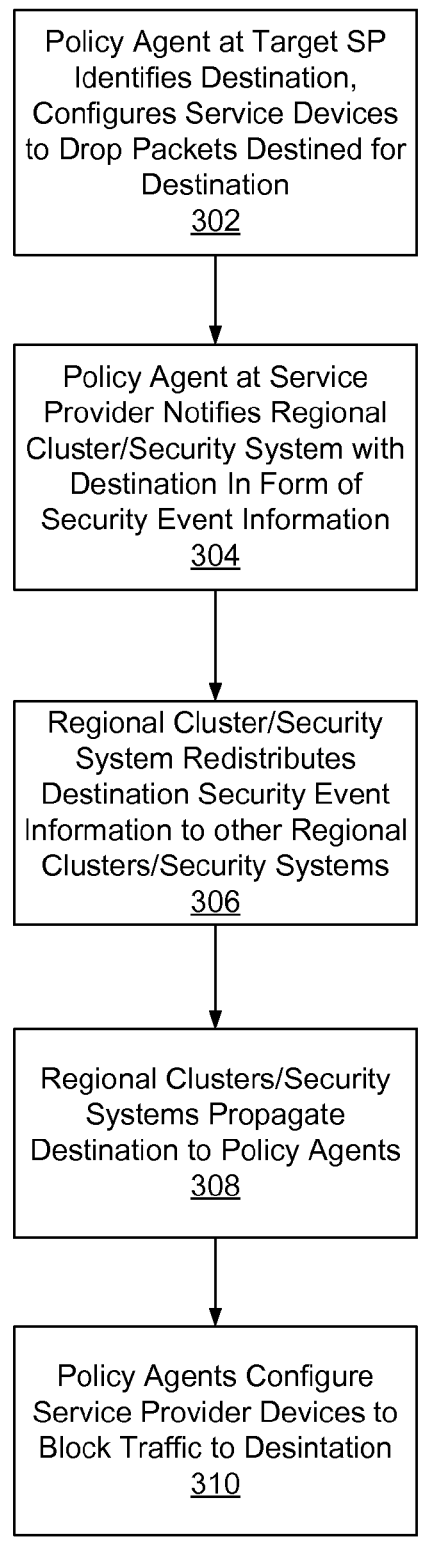
FIG. 3 is a flow chart or control flow diagram illustrating the steps or stages of an exemplary method, process, function, or operation that may be performed in a WAN system configured in accordance with at least one embodiment of the invention.

FIG. 3 is a flow chart or control flow diagram illustrating the steps or stages of an exemplary method, process, function, or operation that may be performed in a WAN system configured in accordance with at least one embodiment of the invention. At step 302, the policy agent associated with the target SP determines that an "attack" has been made, e.g., a threshold for a rule has been reached, and in response null routes the destination prefix under attack. At step 304, the policy agent notifies the security server of the null route for the targeted destination prefix. At step 306, the security server distributes the null route information for the targeted destination prefix (i.e., information and/or data sufficient to identify the target of the attack) to the policy agents of one or more other participating SPs. Note that the security server functionality may be implemented as a network of servers itself, in which case the null route information may be propagated to the other participating SPs through this network of security servers, e.g., via regional neighbor clusters. At step 308, the policy agents of the one or more other participating SPs null route messages intended for the targeted destination prefix, which, at step 310, results in improper traffic directed toward the targeted destination prefix being blocked and prevented from delivery by the actions of the other participating SPs, thereby partially or fully neutralizing the impact of the attack on the targeted destination prefix.

Figure 4:
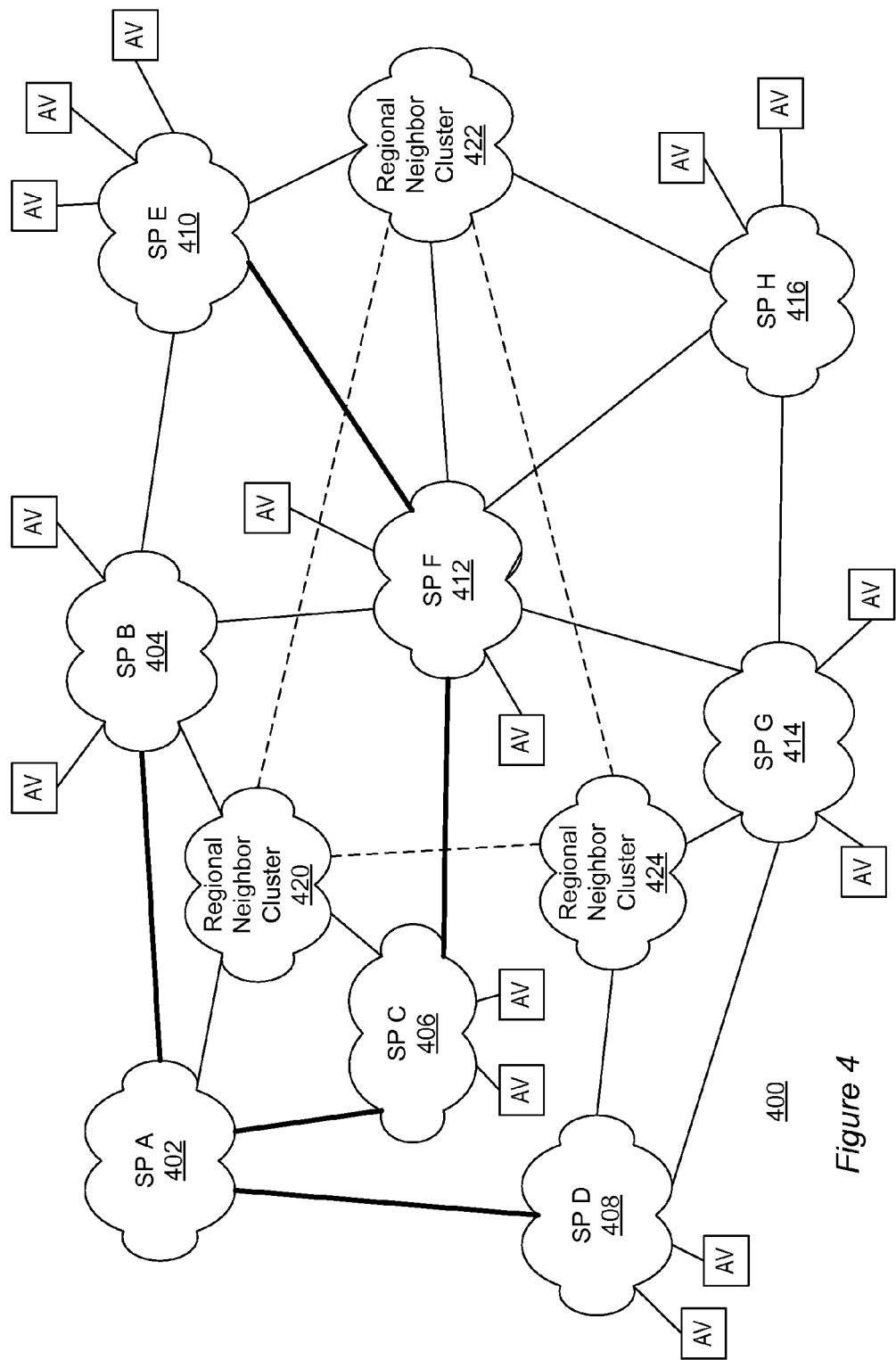
FIG. 4 is a diagram illustrating the example of a WAN system under DDoS attack as shown in FIG. 1, and configured in accordance with at least one embodiment of the invention to respond to the DDoS attack.

FIG. 4 is a diagram illustrating the example of a WAN system under DDoS attack as shown in FIG. 1, and configured in accordance with at least one embodiment of the invention to respond to the DDoS attack. In this figure, the SPs have been configured with policy agents as illustrated in FIG. 2. In this example, regional neighbor clusters 420 422 and 424 are in communication with one another as well as with their corresponding participating SPs. The communication links between SP A 402 and SP B 404, and between SP C 406 and SP D 408 are assumed to be saturated with attack traffic, as are the connection between SP C 406 and SP F 412, and the connection between SP E 410 and SP F 412, which are indicated by heavy lines in the diagram. The figure represents an example of the WAN system 400 at the beginning of a DDoS attack.

Figure 5:
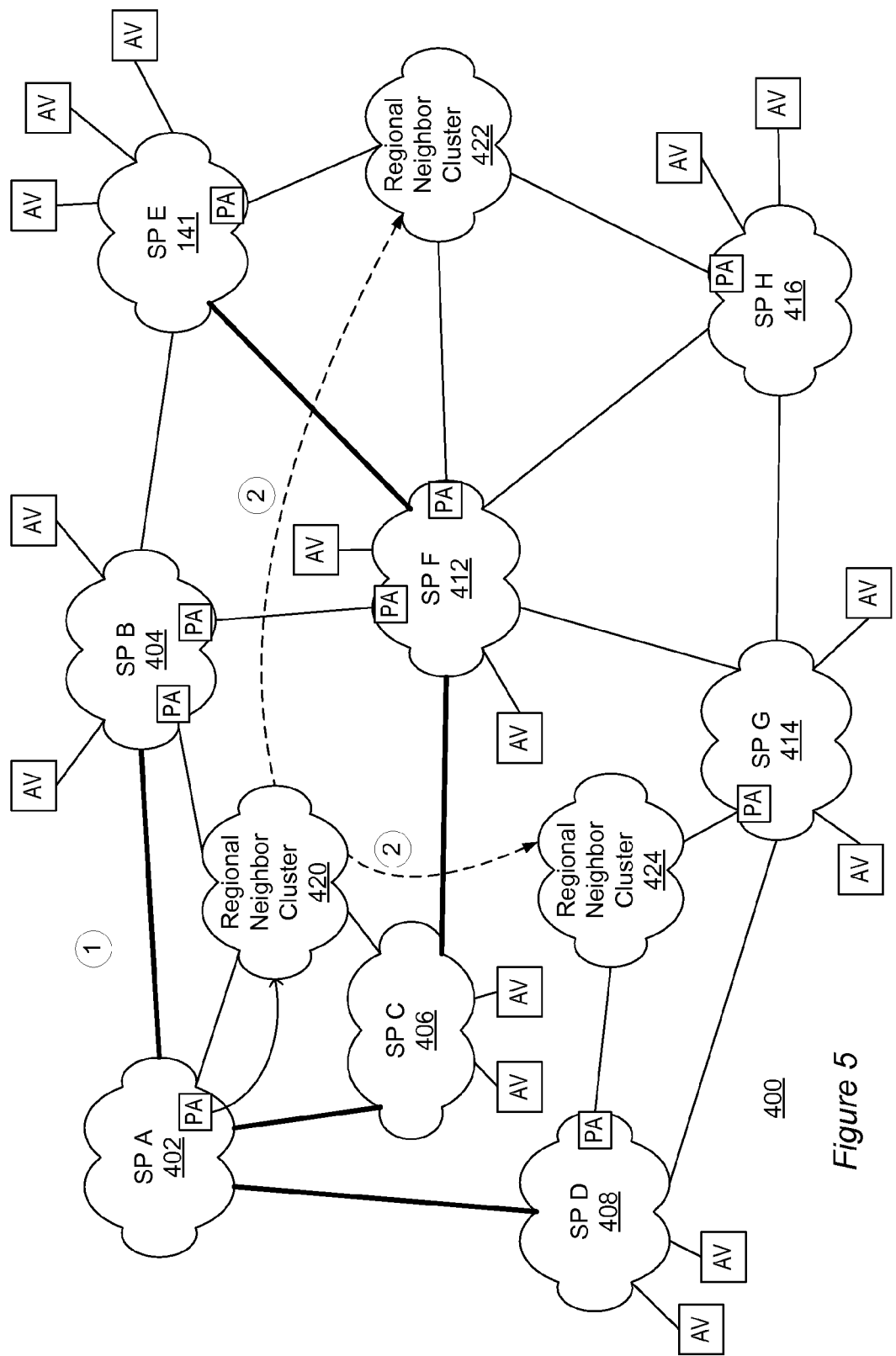
FIG. 5 is a diagram illustrating the initial stages of the response to the DDoS attack on the WAN system shown in FIG. 4, and which is configured in accordance with at least one embodiment of the invention.

FIG. 5 is a diagram illustrating the initial stages of the response to the DDoS attack on the WAN system shown in FIG. 4, and which is configured in accordance with at least one embodiment of the invention. As suggested/shown in the figure, the policy agent at SP A identifies the attack and notifies regional neighbor cluster 420, requesting a null route for the destination prefix for the attack. Regional neighbor cluster 420 then forwards the null route request to one or more other regional neighbor clusters 422 and 424.

Figure 6:
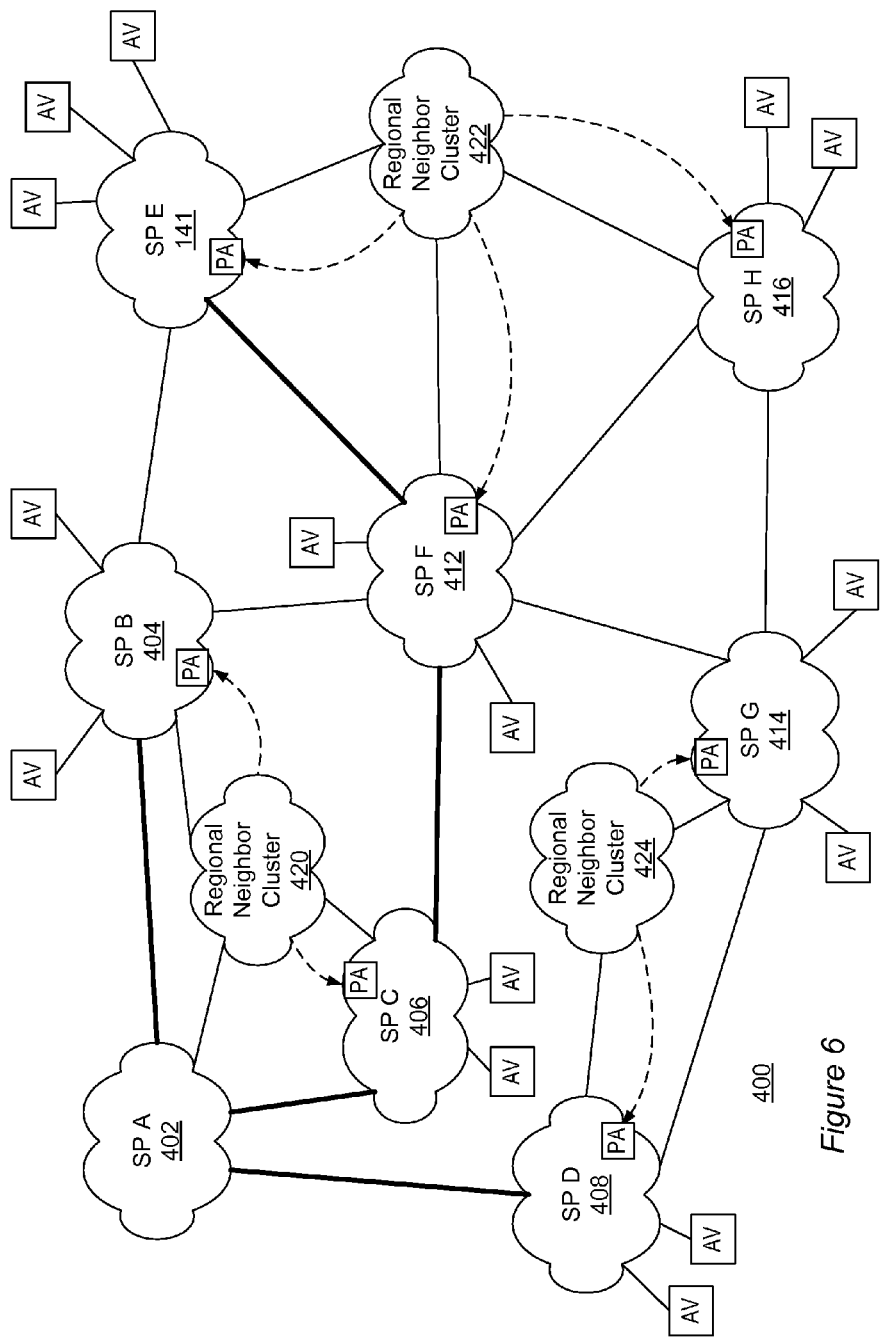
FIG. 6 is a diagram illustrating one example of the possible further stages of a response to the DDoS attack on the WAN described with reference to FIG. 4, in accordance with at least one embodiment of the invention.

FIG. 6 illustrates one example of the possible further stages of a response to the DDoS attack on the WAN described with reference to FIG. 4, in accordance with at least one embodiment of the invention. As suggested/shown in FIG. 6, the one or more regional neighbor clusters 422 and 424 transmit the null route request for the target destination prefix to their participating SPs. The SPs then update their routing tables to null route the target destination prefix.

Figure 7:
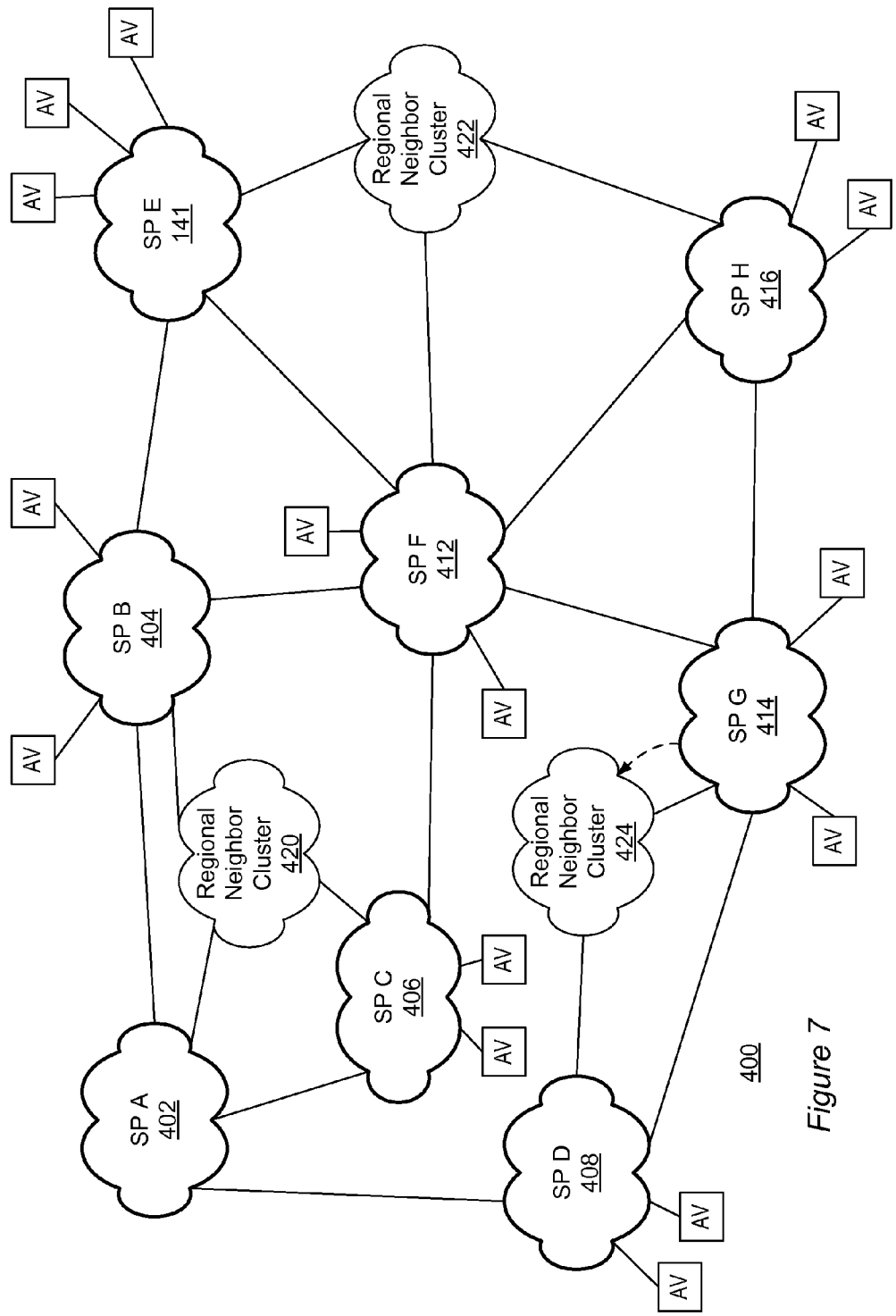
FIG. 7 is a diagram illustrating one example of a state of the response to a security event as implemented within the WAN system shown in FIG. 4, in accordance with at least one embodiment of the invention. In this embodiment, the SP network is configured to use a security protocol to report identifying metadata information about the Attack Vector (AV) to the organization/node managing the Deviant Activity Controller or Security Service System.

FIG. 7 is a diagram illustrating one example of a state of the response to a security event as implemented within the WAN system shown in FIG. 4, in accordance with at least one embodiment of the invention. In this embodiment, the SP network is configured to use a security protocol to report identifying metadata information about the Attack Vector (AV) to the organization/node managing the Deviant Activity Controller or Security Service System. The participating SPs have been configured (i.e., their routing tables have been modified) and now operate to null route all traffic that they receive directed toward the target destination prefix, thereby resulting in a situation where the destination prefix can no longer be communicated with. This has the effect of blocking such undesirable traffic at the edges of the SPs, which is illustrated by the heavy lines on the network clouds representing the null routing SPs in the figure. Once the undesired traffic is null routed, the previously saturated connections typically return to normal and are used to efficiently route other traffic. In this example, the connections between SPs now show normal, unsaturated traffic and the SPs are able to function normally without impairment by the DDoS attack. However, note that the infected attack vectors may still be attempting to transmit attack traffic to the SPs.

Figure 8:
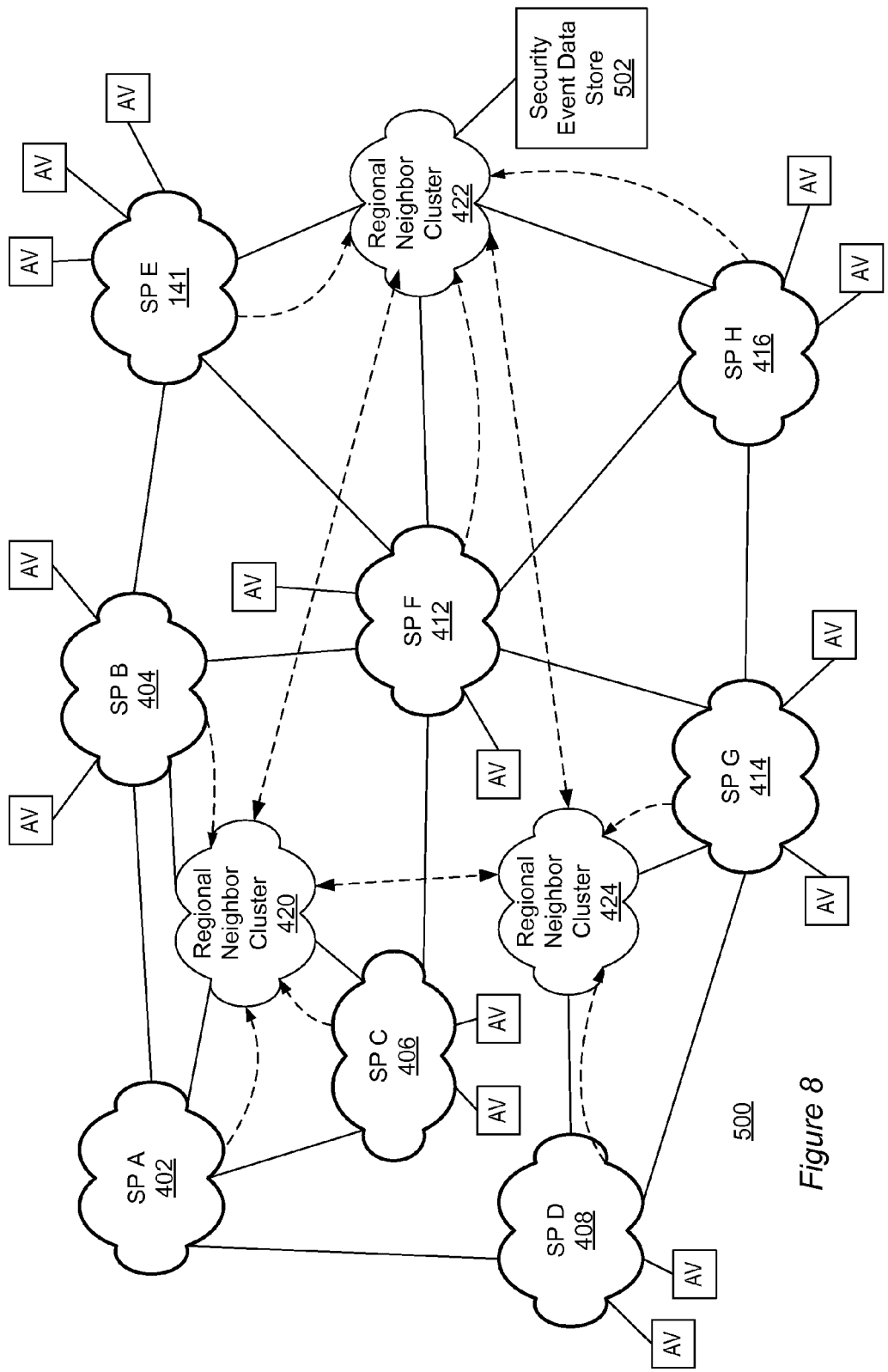
FIG. 8 is a diagram illustrating one example of the possible further stages of a response to the DDoS attack on the WAN described with reference to FIG. 4, in accordance with at least one embodiment of the invention.

FIG. 8 is a diagram illustrating one example of the possible further stages of a response to the DDoS attack on the WAN described with reference to FIG. 4, in accordance with at least one embodiment of the invention. In this example, WAN system 500 is configured to execute additional stages of a response to the DDoS attack as compared to the example of WAN system 400 in FIG. 4. For example, in the implementation or embodiment of FIG. 8, the SPs send protocol metadata regarding the attack vector to the regional neighbor clusters and, in this example, regional neighbor clusters 420 and 424 forward this data to server 422 for analysis of the attack vector data, where it is stored in an event database for security event (attack vector) data store 502.

For example, the SPs may be configured to forward the protocol metadata for each attack vector that is null routed at the source SP in response to the attack. For example, the metadata may include some or all of the following protocol metadata fields, which are stored in data store 502 as "ip_accounting" (or other suitable field or data identifier):

agent_id
class_id
mac_src
mac_dst
vlan
as_src
as_dst
ip_src
ip_dst
iface_in
iface_out
src_port
dst_port
tcp_flags
ip_proto
tos packets
bytes
flows
stamp_inserted
stamp_updated
In one example, a suitable protocol packet structure used to communicate the metadata may be described by:

```
struct packet {
    unsigned int length;     /* packet length */
    unsigned int protocol;   /* IP Protocol type */
    signature;               /* remote AS crypto hash */
    router_id;               /* remote AS unique router-id */
    unsigned int iface_id    /* Interface ID of router_id */
    ip src_ip;               /* Source IP Address */
    ip dst_ip;               /* Destination IP Address */
    unsigned int ttl;        /* TTL val of original packet */
    hw_mac;                  /* Source MAC */
    unsigned int src_port;   /* TCP/UDP source port */
    unsigned int dst_port;   /* TCP/UDP destination port */
    unsigned int tcp_flags;  /* TCP flags */
    unsigned int tos;        /* IP type of service */
}
```

The originating AS (where BGP uses AS numbers to identify SP network—if an IP block or attack is originating from an AS, it means that the IP block or attack is coming from a specific SP) of the packet is determined by the non-repudiated signature of the source of the protocol metadata packet.

Note that the above list of metadata represents a set of possible information that may be provided by one node to others (such as from an Agent to a SP, from one SP to another SP, from one SP to a security service device, etc.). Other possible types and/or combinations may include metadata from edge and core routing and switching devices (or other network nodes) to regional clusters, to a security system local to the SP, or to a global security system. In some embodiments, a subset of the possible set of metadata may be used to characterize a threat, with the subset representing metadata that is sufficient to enable a response to a threat, although perhaps not an optimal response. For example, when a flow of metadata is received it yields a list of network nodes, where the information covered by the packet struct is associated with each node. Using this information (which is specific to ASN→RouterID→Switch-Port→IP Address→MAC Address), the system can create a report for the AS owning SP which provides knowledge of the nodes on the SP network which were used in the attack (the attack vector).

The attack vector data may be analyzed to identify information or characteristics regarding the infected attack vectors (nodes) on the participating SPs (i.e., devices or processes that have become compromised). For example, a metadata signature for the attack (e.g., port, payload size, etc.) may be used to find messages/data having the same or a similar metadata signature that were handled by the SP through analysis of the records of traffic in the SPs. If the metadata pertaining to a specific node includes traffic matching the attack signature (e.g., packets sent by the node or device match the signature of the attack packets), then the node is identified as having been compromised.

One example of the type of analysis that may be performed on the attack vector data is to determine the number of devices used in the attack by counting the number of nodes in the data store 502 for a specific event id (e.g. 20150406-31337), where that traffic was sent to the target destination prefix. In the following SQL like based examples, the target destination prefix is "1.2.3.4". For example: select count (ip_src) from events where ip_dst='1.2.3.4' and id='20150406-31337'.

Another example of the type of data analysis and reporting is one where the system could report the infected nodes on an SP network in phases:

Phase 1, get a unique list of all ASNs (SPs), where nodes hosted by the ASN were involved in the attack;

Phase 2: (AS List) select distinct asn from events where id='20150406-31337'; and Phase 3: For each of the ASNs gathered from Phase 2:
  Prepare report for each AS (e.g. AS 55191)
  Step A: select router id, iface_id, src_ip, hw_mac from events where asn=55191 and id='20150406-31337';
  Step B: output report to AS owner registered contact in preferred report format via preferred method.

In this example, an exemplary report to AS 55191 may look like:

| RouterID    | IfaceID | SRC_IP       | HW_MAC          |
|-------------|---------|--------------|-----------------|
| 10.47.196.5 | 24      | 10.5.5.5     | 0090.7f8d.b8d4  |
| 10.47.196.5 | 24      | 10.5.5.17    | 6eb3.d59d.000d  |
| 10.47.196.5 | 24      | 10.5.6.54    | 06bd.bfef.df3a  |
| 10.47.196.5 | 55      | 10.5.10.5    | 0ad1.a5d4.6546  |
| 10.47.196.2 | 7       | 10.3.4.5     | 5e82.0e96.3ba4  |
| 10.47.196.2 | 27      | 10.3.4.50    | 167d.3c37.37dc  |
| 10.47.196.2 | 48      | 10.5.4.150   | eaab.ac35.fedd  |
| 10.47.196.2 | 69      | 10.5.4.51    | 42f5.1af1.fc96  |
| 10.47.196.17| 190     | 172.16.15.51 | 4e24.f9da.f18f  |
| 10.47.196.17| 191     | 172.16.15.52 | 0a26.616b.3b87  |
| 10.47.196.17| 57      | 172.16.15.53 | 8e4e.6af3.0cdd  |
| 10.47.196.17| 58      | 172.16.15.54 | 226c.5479.c36b  |
| 10.47.196.17| 59      | 172.16.15.55 | 7ab7.d384.caff  |

The report can be delivered using any suitable method (although usually via HTTP), using any desired format (such as JSON, XML, CSV, or a Tabular format such as illustrated above).

Another example of data analysis that may be used to block a type of improper or undesired traffic is in conjunction with a firm such as Spam House, which operates to analyze a number of data sources to trace an instance of spam to the spam email relays used in a spamming campaign. For this application or use case, the IP or prefix of a spam relay used in a known spam campaign can be injected as a bad route in which the spam email relay node is "ex-communicated" and treated in the same manner as the subject or prefix of an attack destination. This can be used to effectively kick the spam email relay server off of the network, in effect making two way communications (a requirement for email and TCP/IP) with the spam relay server impossible. A notification may be distributed via the security system via BGPv4 (or another suitable protocol) to the other SPs to null route traffic to the spam relay node. This method would typically not use a traditional RuleSet as is used for detecting DDoS or other network anomalies, but rather a pre-determined dataset received from an Anti-Spam service (e.g., Spam House).

Figure 9:
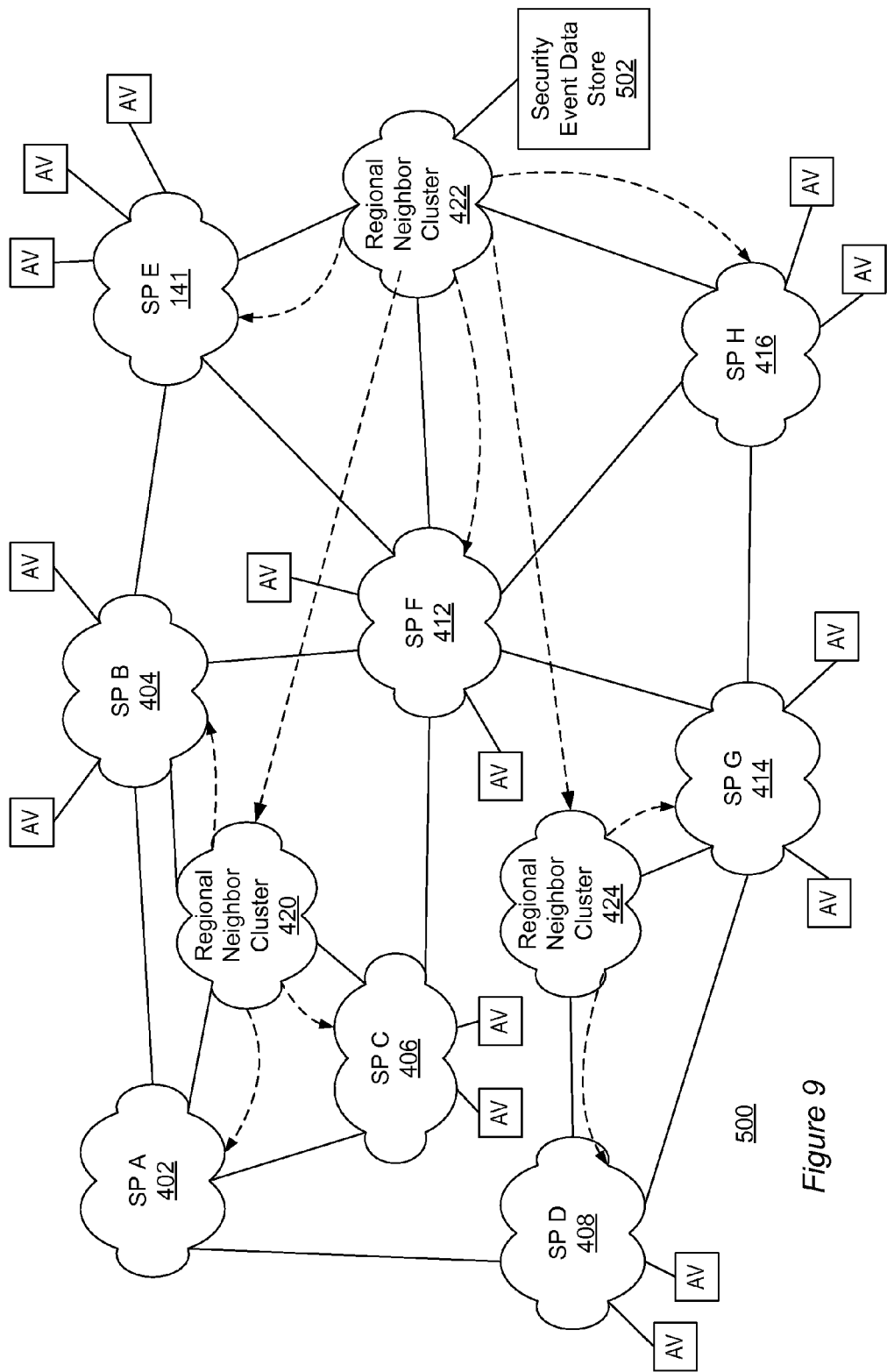
FIG. 9 is a diagram illustrating an example of the possible further stages of the response to the security event (e.g., DDoS attack) on the WAN system shown in FIG. 8, in accordance with at least one embodiment of the invention.

FIG. 9 is a diagram illustrating an example of the possible further stages of the response to the security event (e.g., DDoS attack) on the WAN system shown in FIG. 8, in accordance with at least one embodiment of the invention. In this example, one or more reports are being sent by the Regional Neighbor Clusters to the participating SPs, identifying the infected attack vectors on those SPs (note that in an optional configuration, all Regional Clusters may contain a copy of the Security Event datastore). A report may include, for example, the agent identifier for the route or switching device originating the traffic (agent_id) and the interface identifier (iface_id) which identifies the port through which the traffic is received. The SPs may utilize this data to contact the user of the infected attack vector (node) and advise them that their device has been compromised. Further, the SP may put the node into a virtual "jail" in which communications are restricted, so that the node can only communicate with the security service. The operator of the node may be required to provide proof that the affected node has been cleansed and is therefore suitable to be placed back on the network again.

The data may also be used for additional actions by the policy agents of the SPs. For example, the SPs may use the infected attack vector data to shut down the originating source port (iface_id) automatically in order to block further incoming traffic from those attack vectors. SPs may then contact the security service to download scripts which will automatically reconfigure their routing and switching devices to quarantine and/or disable the ports of infected/affected nodes. Alternatively or in addition, a rule may provide for the traffic for the port to be forwarded for further analysis by law enforcement.

Figure 10:
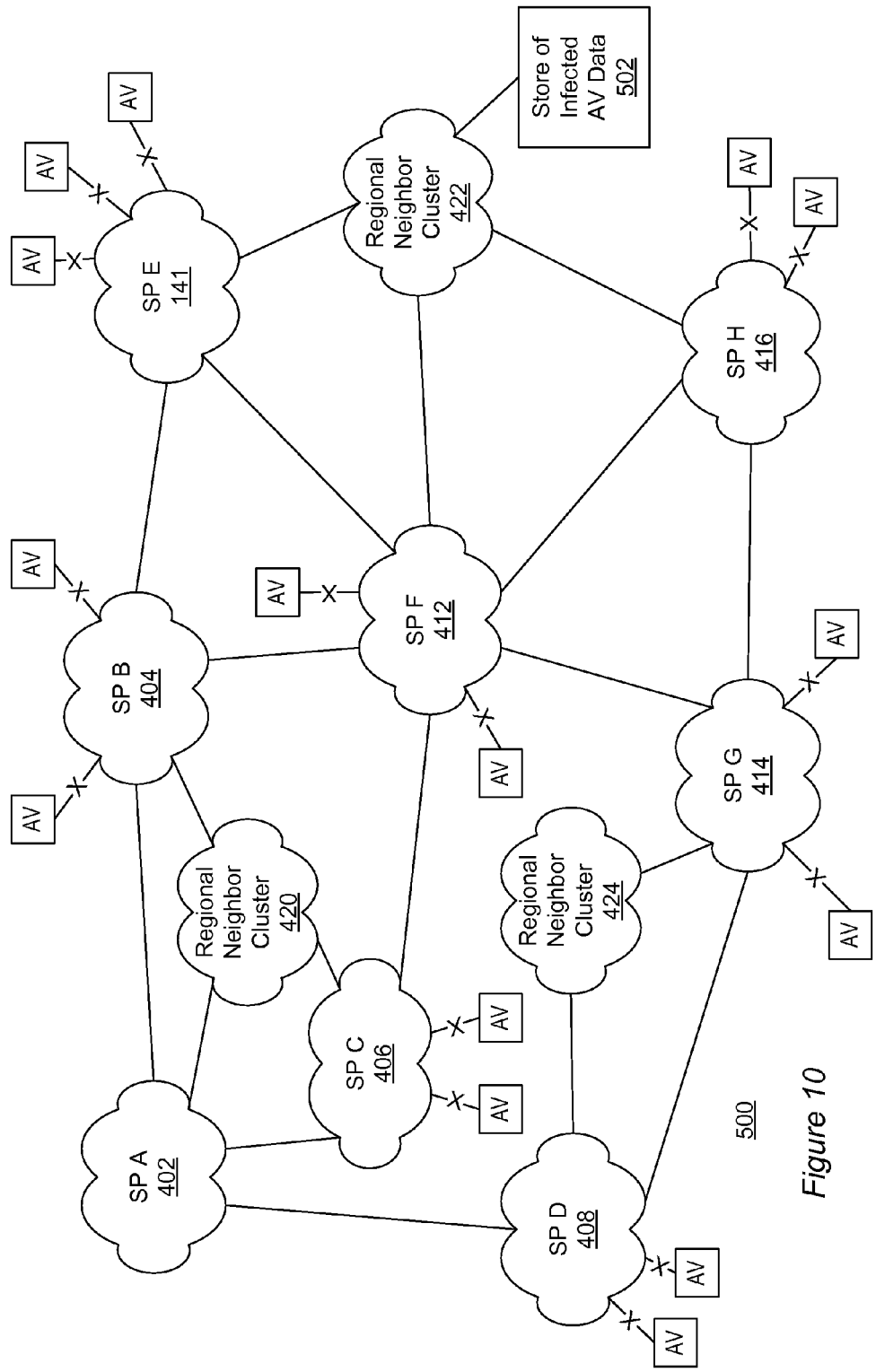
FIG. 10 is a diagram illustrating one example of a state of the response to the DDoS attack on the WAN system shown in FIG. 8, in accordance with at least one embodiment of the invention, and in which the WAN system has neutralized the attack vectors involved in the DDoS attack.

FIG. 10 is a diagram illustrating one example of a state of the response to the DDoS attack on the WAN system shown in FIG. 8, in accordance with at least one embodiment of the invention, and in which the WAN system has neutralized the attack vectors involved in the DDoS attack. In this example, the WAN system has effectively neutralized the attack vectors involved in the DDoS attack denoted by the 'x' preventing traffic to the SP network. This is due to the interface being disabled or being moved into a "quarantine" group. Once the attack vector (nodes) have been neutralized or disabled, the attack destination prefix is removed and the attack target destination is back online.

Figure 11:
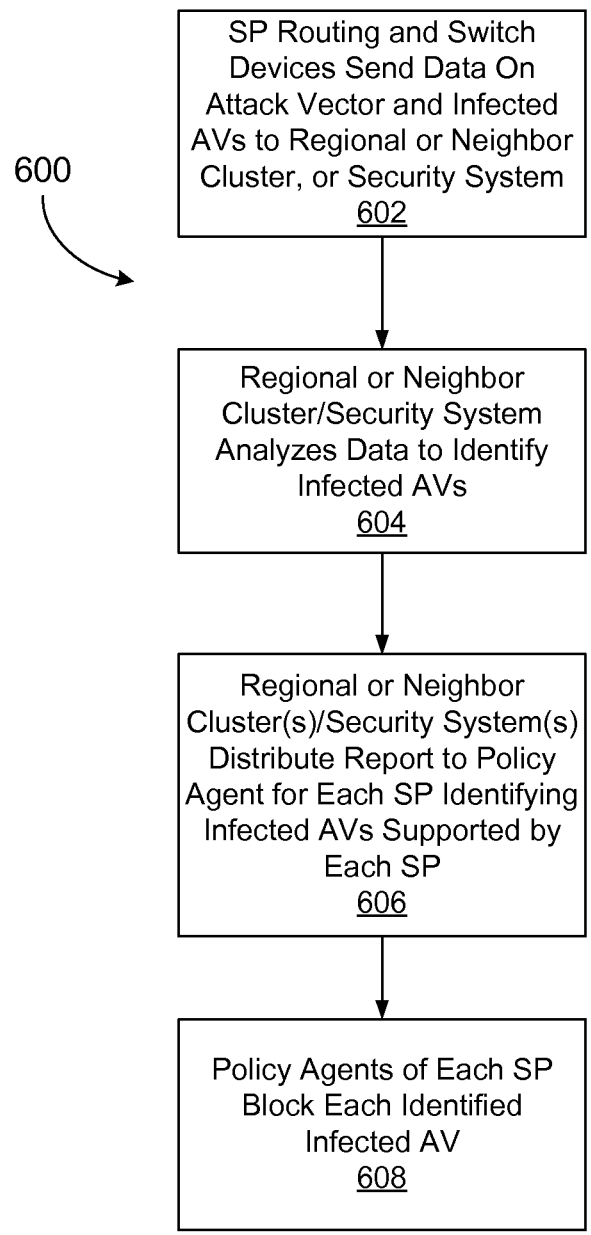
FIG. 11 is a flow chart or control flow diagram illustrating the steps or stages of an exemplary method, process, function, or operation (in this case using a bi-directional protocol) that may be performed in a WAN system configured in accordance with at least one embodiment of the invention.

FIG. 11 is a flow chart or control flow diagram illustrating the steps or stages of an exemplary method, process, function, or operation (in this case using a bi-directional protocol) that may be performed in a WAN system configured in accordance with at least one embodiment of the invention. In this example, at step 602, the routing and switching devices in the SPs send attack vector metadata to the security server (or to a regional cluster from which it is provided to the security system server). At step 604, the security server analyzes the attack vector metadata in order to identify one or more infected attack vectors (nodes). At step 606, the security server or servers prepare a report for each SP and notify the SP that a report is ready (based on their reporting preferences). The report identifies the infected attack vectors on that SP. At step 608, the policy agents for each SP reprogram the SP routing and switching devices in real time to cause the originating port for the attack vector to be shut down (or placed into quarantine) for each infected attack vector.

Note that the examples described herein are not intended to be exhaustive or to place a limitation on the type of networks, computing environments, metadata, or analysis techniques that may be used in an implementation of an embodiment of the invention. Alternatively, or in addition, computer or communication network environments suitable for application of various embodiments of the invention may include any suitable system that provides for attack vector devices to communicate with one another. Examples of such suitable systems include, but are not limited to (or required to include) wireless networks, optical networks, and homogeneous and heterogeneous networks that may include any type of user devices, servers, routers, network nodes, gateways, etc. Although the examples above may reference the example computing environment depicted in the figures, it will be apparent to one of skill in the art that the examples may be adapted or modified for alternate computing devices, systems, architectures, and environments.

Note further that in some embodiments, the inventive system and system architecture may include one or more centralized nodes that operate as a common communication node for a set of policy agents or policy agent processes. Thus, in some embodiments, there may be multiple hierarchies of nodes participating in detecting and managing the various "threats" to the overall network. These hierarchies may include individual nodes/devices, regional clusters of devices communicating with a server or control node, and multiple regional clusters communicating with one or more centralized nodes. In the latter case, the centralized node or nodes may coordinate the communications between regional clusters with which they are in communication to enable the efficient and appropriate transfer and processing of attack vector related data. For example, a single centralized cluster or one of a limited number of "super-regional" clusters may generate threat detection and/or assessment rules used at lower levels of the hierarchy by SP servers or devices and make them available to those lower level devices, elements, processes, etc.

Note also that while some threats may require specific types of metadata to properly characterize, others may be effectively characterized by a more limited set of information. For example, the source IP and MAC address pair may be sufficient to permit certain types of threat identification and mitigation. In general applications, the inventive system and methods use metadata that is communicated between elements of a WAN to prevent continued communications between one or more network nodes and a "target" address from utilizing network resources.

In addition, note that while in many of the examples provided a policy agent may operate to "null route" messages directed to the "target" address, this is not the only way in which such messages may be (re)routed. For example, such messages may also (or instead) be routed to a suitable data processing element that is designed to "mine" and/or apply more advanced detection and threat assessment processes or modeling to the message data or metadata. This routing to a specialized data processing element/node/process may be dependent on the rule or threshold that is triggered, the value of a specific element of metadata, a characterization of the message or metadata, etc. In some cases this may provide additional insight by application of advanced analysis techniques to a larger set of data samples.

In some embodiments, when a Policy Agent (PA) detects an issue (such as what appears to be an attempted DDoS type attack), it creates an "event". The event information (such as metadata and/or other data characterizing the event) is sent from the Policy Agent to the local Security Service System/Regional Cluster with which it communicates as part of a larger network. The Policy Agent then reprograms the local SP routing and switching devices to null-route (or otherwise re-direct) the destination prefix (host or network) for the attack or attempted attack. In turn, the associated Security Service System/Regional Cluster/Deviant Activity Controller interacts with other Security Systems/Regional Clusters/Deviant Activity Controllers with which it is communicatively coupled to distribute the event data/information to them, and by virtue of that to the participating policy agents associated with each of the SP that are communicatively coupled to each Security Service/Regional Cluster/Deviant Activity Controller. The policy agents that receive the event data/information then reprogram the network devices in their corresponding SP network to null-route (or otherwise redirect) the destination prefix.

Further, in some embodiments, after having been programmed to redirect/block/null-route event traffic, the network devices that are part of a SP network that is utilizing the appropriate protocol (such as the Signed Packet Metadata Streaming protocol, which identifies sources of attack vector (AV)) are engaged and configured to send metadata from any port on the network devices which have attempted to communicate with the destination prefix. This allows tracking of those devices being misused as part of the attack.

Note that in a network architecture that may be used to implement an embodiment of the inventive system and methods, there may be several layers or levels of nodes or elements. These may include individual user devices, routers, control points, servers, etc. A plurality of these devices, routers, etc. may be communicatively coupled within a SP network. Multiple SP networks may be communicatively coupled to each other and/or to a Security Service/Regional Cluster server/Deviant Activity Controller/node. Multiple Regional Cluster server/nodes may be communicatively coupled to a centralized control node. Although each individual user device, router, etc. may be communicatively coupled (in theory) to the other elements/nodes of the overall WAN, in reality there is a different degree of the coupling for certain elements/nodes and other elements/nodes. In this respect, some of the couplings may be more direct (that is, requiring fewer "hops" or data transfer paths) or indirect (that is, requiring a greater number of "hops" or data transfer paths) than others. Similarly, an element/node may be more or less closely communicatively coupled to one element/node than to another (depending on the number of hops or transits needed to connect the two elements/nodes).

In accordance with at least one embodiment of the invention, the system, apparatus, methods, processes and/or operations for administering a wide area network in a manner intended to reduce and control the negative impact of an improper action may be wholly or partially implemented in the form of a set of instructions executed by one or more programmed computer processors, such as a central processing unit (CPU) or microprocessor. Such processors may be incorporated in an apparatus, server, network element, network node, client or other computing device operated by, or in communication with, other components of the system.

Figure 12:
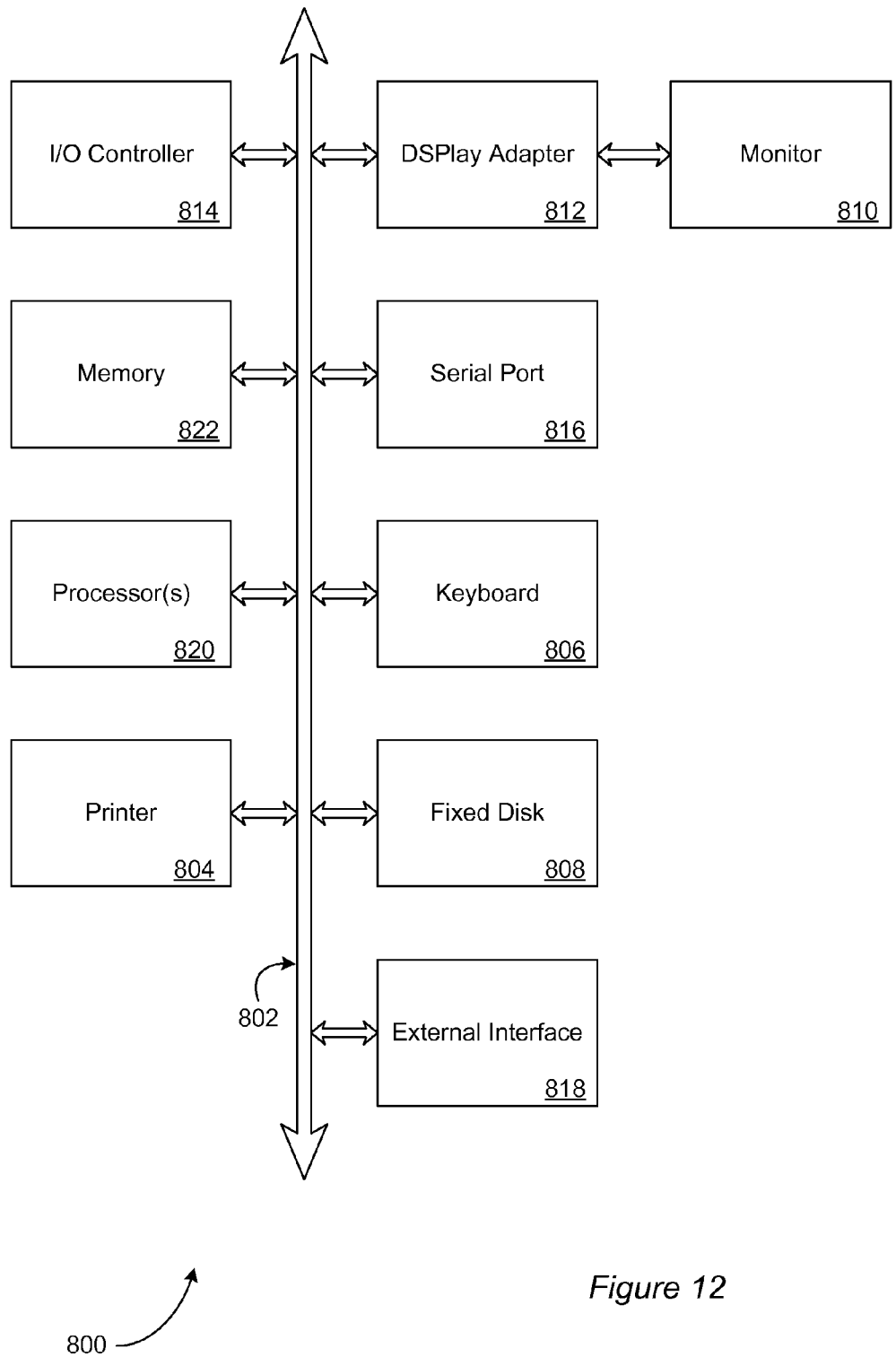
FIG. 12 is a diagram illustrating elements that may be present in a computer device and/or data processing system configured to implement a method, process, function, or operation in accordance with an embodiment or embodiments of the present invention.

FIG. 12 is a diagram illustrating elements that may be present in a computer device and/or data processing system configured to implement a method, process, function, or operation in accordance with an embodiment or embodiments of the present invention. The subsystems shown in FIG. 12 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 12 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A system for controlling the impact of improper network activity on the operations of a wide area network, comprising:
a plurality of service provider devices, each service provider device configured to provide communications and data transfer services to a plurality of potential target devices associated with the service provider device, wherein each service provider device includes a policy agent element or process;
one or more security service devices, wherein the policy agent element or process of each of the plurality of service provider devices is communicatively coupled to at least one of the one or more of the security service devices;
wherein each policy agent element or process is configured to detect an improper network event, and in response to provide the security service device or devices to which it is communicatively coupled with data relating to the improper network event;
wherein each of the one or more security service devices is configured to forward received data relating to an improper network event to one or more of the policy agent elements or processes that are communicatively coupled to the security service device, thereby providing the data relating to the improper network event to each service provider device that includes one of the one or more of the policy agent elements or processes that are communicatively coupled to the security service device;
wherein upon receipt of the data relating to the improper network event, the policy agent elements or processes are configured to cause the service provider device with which they are associated to inhibit the transfer of traffic intended for a target device identified by the data;
wherein each of the policy agent elements or processes is further configured to send metadata for each message caused to be inhibited to the security service device to which it is communicatively coupled, and further, wherein that security service device is further configured to analyze the metadata sent by the policy agent elements or processes and to identify infected devices based at least in part on the metadata, and;
wherein the policy agent elements or processes are configured to block access by the identified infected devices to the service provider device with which the policy agent elements or processes are associated.

2. The system of claim 1, wherein in the situation of there being more than one security service device, each security service device is communicatively coupled to at least one other security service device.

3. The system of claim 1, wherein the data provided to the security service device or devices further comprises a null route request that includes a destination prefix for a target of the improper network event.

4. The system of claim 1, wherein one or more of the policy agent elements or processes are configured to download at least one of a set of community rules, a set of customized rules, and a set of subscriber rules from a security service device to which they are communicatively coupled.

5. The system of claim 4, wherein the set of rules operate to permit the policy agent elements or processes to identify network events indicative of an improper activity.

6. The system of claim 5, wherein the set of rules permit the policy agent elements or processes to identify one or more of a computer virus, an incident of spam, a fraud attempt, or an attempt to obtain protected data.

7. The system of claim 4, wherein a parameter of at least one rule may be customized by a network manager associated with a corresponding service provider device.

8. The system of claim 1, wherein a notification sent by the policy agent elements or processes to the security service device or devices includes data relating to the improper network event, and further includes a null route request that includes a destination prefix to be null routed.

9. The system of claim 1, wherein the service provider device or devices include one or more of a router, a switching device, or another form of network node.

10. A method of controlling the impact of improper network activity on the operations of a wide area network, comprising:
operating a node of a communications network to identify a target or intended target of an improper network activity;
providing data characterizing the target or intended target to a network node that is communicatively coupled to the node operating to identify the target or intended target;
operating the network node that is provided with the data so as to distribute the data to one or more network nodes that are not as closely communicatively coupled to the node operating to identify the target or intended target;
configuring at least one of the one or more of the network nodes that are not as closely communicatively coupled to the node operating to identify the target or intended target to operate to prevent sending or transferring traffic to the target or intended target and to send metadata for traffic caused to be inhibited to the network node that is communicatively coupled to the node operating to identify the target or intended target;
analyzing the metadata as part of a process to identify one or more infected devices; and
blocking access by at least one of the one or more infected devices to at least a portion of the wide area network.

11. The method of claim 10, wherein the node of the communications network operated to identify a target or intended target of an improper network activity is one or more of a router, a service provider server, or a process executed by the router or service provider server.

12. The method of claim 10, wherein the node of the communications network operated to identify a target or intended target of an improper network activity uses a rule or rule set to assist in identifying the target or intended target of the improper network activity.

13. The method of claim 12, wherein the rule or rule set is provided by a security service that is part of the communications network, and further, wherein the rule or rule set causes the node of the communications network to be configured to detect one or more of an incident of spam, a computer virus or an attempt at phishing.

14. The method of claim 10, wherein the provided data characterizing the target or intended target is metadata characterizing flow of traffic to the target or intended target.

15. The method of claim 10, wherein operating the network node that is provided with the data so as to distribute the data to one or more network nodes that are not as closely communicatively coupled to the node identifying the target or intended target further comprises providing the data to one or more network nodes that are communicatively coupled to the network node that is provided with the data, and from those nodes to one or more nodes communicatively coupled to each of the one or more network nodes that are communicatively coupled to the network node that is provided with the data.

16. The method of claim 10, wherein the data provided to the network node comprises a null route request that includes a destination prefix for a target or intended target of the improper network activity.

17. A system for reducing the negative impact of improper network activity on the operations of a wide area network, comprising:
- a plurality of service providers, with each service provider being associated with a set of devices for which the service provider provides communications and data transfer services, and further wherein each service provider is associated with one or more routing, switching, or security devices;
- a policy agent element or process associated with each service provider, wherein each policy agent is configured to peer with the policy agent element or process associated with a different one of the plurality of service providers;
- wherein each of the security devices is configured to send network flow metadata and security information to the policy agent element or process associated with the service provider that the security device is associated with; and
- wherein each policy agent element or process is configured to respond to data indicating an improper network activity by causing each security device associated with the service provider with which the policy agent element or process is associated to inhibit the improper network activity directed toward a target or intended target identified in the network flow metadata and security information.

18. The system of claim 17, further comprising:
- a plurality of regional clusters, wherein each regional cluster is coupled to one or more policy agent elements or processes and is configured to:
- receive security event notifications from the policy agent elements or processes;
- responsive to each received security event notification, to propagate each received security event notification to other regional neighbor clusters and thereby to each policy agent to which the other regional clusters are coupled; and
- where each policy agent is configured to detect a security event and identify a network entity that is a target or intended target of the security event, and in response, to generate a security event notification that includes data identifying the target or intended target, and provide the generated security event notification to the regional cluster to which the policy agent element or process is coupled.

* * * * *